(12) United States Patent
Miyata et al.

(10) Patent No.: US 6,392,644 B1
(45) Date of Patent: May 21, 2002

(54) THREE-DIMENSIONAL GRAPHICS DISPLAY SYSTEM

(75) Inventors: Ryosuke Miyata; Masatoshi Arai; Koichi Murakami, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/222,319

(22) Filed: Dec. 29, 1998

(30) Foreign Application Priority Data

May 25, 1998 (JP) .......................................... 10-143046

(51) Int. Cl.[7] .............................................. G06T 15/00
(52) U.S. Cl. ....................................... 345/419; 345/634
(58) Field of Search ................................ 345/419, 422, 345/425, 430, 431, 435, 582, 597, 629

(56) References Cited

U.S. PATENT DOCUMENTS

| | | | | |
|---|---|---|---|---|
| 5,949,433 A | * | 9/1999 | Klotz ........................ | 345/435 |
| 5,999,185 A | * | 12/1999 | Kato et al. ................ | 345/420 |
| 6,057,856 A | * | 5/2000 | Miyashita et al. .......... | 345/435 |
| 6,154,197 A | * | 11/2000 | Watari et al. .............. | 345/161 |

FOREIGN PATENT DOCUMENTS

EP          0 633 533         1/1995

OTHER PUBLICATIONS

Foley et al., Computer Graphics, Addison–Wesley Publishing company, Second Edition in C, pp. 230–283.*

* cited by examiner

*Primary Examiner*—Cliff N. Vo
*Assistant Examiner*—Huedung X. Cao
(74) *Attorney, Agent, or Firm*—Staas & Halsey LLP

(57) ABSTRACT

A three-dimensional graphics display system jointly uses three-dimensional image representations and two-dimensional image representations, whereby the data processing amount can be effectively reduced. The data structure of the image data used in this system includes (a) three-dimensional polygon data for a three-dimensional object representing a three-dimensional image and (b) two-dimensional image representation data for a two-dimensional image representation object representing a three-dimensional object as a two-dimensional image arranged in a three-dimensional virtual space having two-dimensional image data and a Z-value. Input data is divided, and an object perspective control part determines a perspective order of objects. A rendering process part overlappingly draws objects according to their perspective order, to correctly represent overlap due to perspective representation. Virtual collisions can be rendered by exclusion control of the space areas of all objects. If the data structure includes relational information of all object portions, the data processing amount can be reduced even further.

8 Claims, 24 Drawing Sheets

(a)

101 and 102 are representations of three-dimensional images 103 and 104 are representations of two-dimensional images having a Z-value (b)

(a)

(b)

body     shade (a)

(b)

(a)

(b)

(a)

(b)

(c)

THREE-DIMENSIONAL GRAPHICS DISPLAY SYSTEM

FIELD OF THE INVENTION

The present invention relates to a three-dimensional graphics display system that can represent a three-dimensional virtual space. In particular, the present invention relates to a three-dimensional graphics display system with joint use of a two-dimensional image representation, representing background, resting objects and characters or parts thereof with flat two-dimensional images arranged in the three-dimensional virtual space.

BACKGROUND OF THE INVENTION

In recent years, the ever higher performance of computer systems and the continuous development of multimedia processing techniques has led to environments that can process high-level three-dimensional computer graphics even on personal computers. Dedicated accelerator boards for processing of three-dimensional computer graphics are under continuous development. Games that animate characters or objects such as artificial creatures usually store the object data mainly in form of polygons. To render the object in a fast drawing procedure and to create images with a high flexibility, a texture is wrapped around and pasted to the created polygon mesh.

On the other hand, graphic formats for two-dimensional images are also wide-spread. From a natural image captured with a digital camera or a scanner, high-quality two-dimensional computer graphic images can be created with various computer graphic software packages and authoring tools.

Thus, with three-dimensional graphics processing, images of three-dimensional objects can be created with a high flexibility, whereas with two-dimensional image processing, the creation of high-quality static images is possible. Therefore, by making use of their respective characteristics, the user can take advantage of the two approaches, depending on his goals.

In the past, there have been attempts to simultaneously represent three-dimensional graphics representations and two-dimensional image representations in one three-dimensional virtual space in order to benefit from their respective merits by jointly using three-dimensional graphics and two-dimensional images. However, these attempts consisted largely of pasting two-dimensional images onto the surface of a three-dimensional object. For example, a three-dimensional polygon having a large external surface was arranged in three-dimensional space, and two-dimensional images, such as a texture, were wrapped around and pasted onto this external surface.

As has been mentioned above, two-dimensional images and three-dimensional graphics both have their merits, and there have been attempts to use both three-dimensional and two-dimensional image representations at the same time. However, there are problems with the conventional approaches: With three-dimensional graphics processing, images can be created with a high flexibility, but the number of polygons into which an object can be divided is limited owing to the limits of the computer processing capabilities. Thus, it is difficult to create high-quality, high-definition three-dimensional objects, and overly complicated scenes cannot be drawn. On the other hand, with two-dimensional image processing, high-quality, high-definition rendering is possible, but it cannot be used for movable objects, and a display from another viewpoint is not possible. Therefore, when jointly using three-dimensional graphics and two-dimensional images by pasting a two-dimensional image onto the surface of a three-dimensional object, the quality of the two-dimensional image depends on the quality of the three-dimensional graphics, and a high-quality image cannot be attained due to these limitations, so that the characteristics of three-dimensional graphics and two-dimensional images could not be exploited in their joint use.

In the present invention, a two-dimensional image is not only wrapped around and pasted onto the external surface of a three-dimensional object as in the prior art, but the present invention is adapted to the representation of two-dimensional images in the presence of objects in the three-dimensional virtual space. First, images of static objects for which images from a different viewpoint are not necessary in that scene correspond to "two-dimensional image representations". Second, object portions that are elements of three-dimensional objects can also correspond to "two-dimensional image representations". For example, an object portion such as the shadow of a three-dimensional object moves and deforms depending on the three-dimensional object, but a three-dimensional display of such an object is not necessary and it can be adapted for two-dimensional image representation. Thus, if it were possible to simultaneously render two-dimensional image representations, the data processing amount could be reduced.

An important feature for the simultaneous rendering and display of two-dimensional images and three-dimensional images is that it becomes necessary to control the positions and overlapping in the three-dimensional space of the two. Moreover, it is preferable that in an environment for simultaneous representation of two-dimensional images and three-dimensional images, image processing techniques such as lighting and shading can be applied.

The present invention has been developed under consideration of these aspects. It is a purpose of the present invention to provide a three-dimensional graphics display system wherein objects corresponding to three-dimensional image representations can be represented as three-dimensional objects, objects that can be represented as two-dimensional images are represented as flat two-dimensional images arranged in a three-dimensional virtual space, both two-dimensional and three-dimensional objects can be rendered simultaneously in the three-dimensional virtual space, and a reduction of the data processing amount and an increase of the data processing speed can be achieved.

A three-dimensional graphics display system according to the present invention is characterized in that as input data the system uses image data that comprises (a) three-dimensional polygon data for a three-dimensional object representing a three-dimensional image and (b) two-dimensional image representation data comprising (i) two-dimensional image data for a two-dimensional image representation object representing a three-dimensional object as a two-dimensional image arranged in a three-dimensional virtual space and (ii) a Z-value representing a depth. The three-dimensional graphics display system comprises a data input part; an object perspective control part for determining a perspective order of objects based on the input data; a rendering process part for overlappingly rendering objects in order from a furthest object to a nearest object, based on the determined perspective order, to correctly represent overlap due to perspective representation; an output part for displaying a rendering result. Three-dimensional objects and two-dimensional image representation objects are rendered simultaneously in the three-dimensional virtual space.

According to this configuration, three-dimensional objects and two-dimensional image representation objects can be rendered simultaneously in the three-dimensional virtual space, the data processing amount can be reduced, and the data processing speed can be increased.

It is preferable that this three-dimensional graphics display system further comprises an object exclusion control part for exclusion-controlling an area occupied by the three-dimensional object and an area occupied by the two-dimensional image representation object, and the system can represent a virtual collision in the three-dimensional virtual space between the three-dimensional object and the two-dimensional image representation object, the virtual collision being caused by a movement of the three-dimensional object.

According to this configuration, the presence of two-dimensional image representation objects in the three-dimensional virtual space can be represented more naturally.

It is preferable that in this three-dimensional graphics display, the input data further comprises supplementary three-dimensional polygon data that is three-dimensional polygon data associated with the two-dimensional image representation data for the two-dimensional image representation object, the supplementary three-dimensional polygon data representing a three-dimensional object that is the basis of the two-dimensional image representation object as a three-dimensional image; the system further comprises a data switching part for switching from two-dimensional image representation data to supplementary three-dimensional polygon data; and the data switching part selectively switches from two-dimensional image representation data to supplementary three-dimensional polygon data to represent a two-dimensional image representation object as a three-dimensional object.

According to this configuration, the system can switch from static two-dimensional image representation objects to movable three-dimensional objects, depending on the situation. For example, if there is a virtual collision in the three-dimensional virtual space, the movement or fall of such object can be represented, so that a more flexible and natural representation of the three-dimensional virtual space is possible.

It is preferable that in this three-dimensional graphics display system, the input data further comprises object-relation information that is associated with a relation between image data of object portions and other object portions as data for object portions forming a character in the three-dimensional virtual space; for each object portion, the rendering process part performs a rendering process based on the three-dimensional polygon data or the two-dimensional image representation data for the object portion and the object-relation information; and a movement of the character is represented by renewing the object-relation information.

According to this configuration, one character can be configured as being rendered simultaneously by three-dimensional object portions and two-dimensional image representation object portions. Moreover, due to the renewal of data for certain object portions, the data for related object portions is renewed, so that it is not necessary to provide, process and renew independent data for all object portions. Thus, a reduction of data processing and an increase in the data processing speed can be attained.

It is preferable that this three-dimensional graphics display system further comprises a two-dimensional image processing part for image processing of two-dimensional images; the input data further comprises two-dimensional image processing instruction data for instructing two-dimensional image processing of the two-dimensional image representation object; and based on the two-dimensional image processing instruction data, the two-dimensional image processing part performs two-dimensional image processing of the two-dimensional image representation data for the two-dimensional image representation object.

According to this configuration, two-dimensional image processing, such as deformation, shading or edge emphasis, can be applied to two-dimensional image representation objects, so that more flexible image processing effects can be attained.

It is preferable that in this three-dimensional graphics display system, a child object and a parent object are in a perspective order to each other in the three-dimensional virtual space, the child object is a two-dimensional image representation object displayed by overlapping, and the child object is drawn into the parent object; the input data further comprises (a) two-dimensional image representation data for the parent object, and (b) hierarchical information expressing the hierarchical relationship between the parent object and the child object; the rendering process part performs a rendering process based on image data of the parent object, an object that is not in a hierarchical relationship with the parent object, and the child object, wherein the other object is between the parent object and the child object in the perspective order determined by the object perspective control part.

According to this configuration, the number of rendering processes for child objects when there is no other object between the child object and the parent object can be decreased, so that a reduction of data processing and an increase in the data processing speed can be attained. Moreover, when there is another object between the child object and the parent object, the child object can be correctly overlapped, and the perspective order in the three-dimensional virtual space can be correctly represented.

A computer-readable recording medium according to the present invention stores a program for displaying an image of a three-dimensional object on an output device based on three-dimensional polygon data. The program performs an input step of inputting (a) three-dimensional polygon data for a three-dimensional object representing a three-dimensional image and (b) two-dimensional image representation data comprising (i) a two-dimensional image for a two-dimensional image representation object representing a three-dimensional object as a two-dimensional image arranged in a three-dimensional virtual space and (ii) a Z-value representing a depth; a determination step of determining a perspective order of objects based on the input data; a rendering step of overlappingly rendering objects in order from a furthest object to a nearest object, based on the determined perspective order, to correctly represent overlap due to perspective representation; and an output part for displaying a rendering result. Three-dimensional objects and two-dimensional image representation objects are rendered simultaneously in the three-dimensional virtual space.

According to this configuration, three-dimensional objects and two-dimensional image representation objects can be rendered simultaneously in the three-dimensional virtual space on a computer.

BRIEF DESCRIPTION OF THE DRAWINGS

FIG. 7 is a flowchart outlining the process steps of the object perspective control part 30a.

DESCRIPTION OF THE PREFERRED EMBODIMENTS

First Embodiment

The three-dimensional graphics display system according to a first embodiment of the present invention jointly uses two-dimensional image representations. This three-dimensional graphics display system divides all objects present in a scene into two groups: a group of movable objects such as artificial creatures that move according to user instructions, and a group of static objects such as background and resting objects. The three-dimensional graphics display system displays the movable objects as three-dimensional objects by specifying three-dimensional polygon data, and the static objects as flat objects (referred to as "two-dimensional image representation objects" below) arranged in three-dimensional space by specifying two-dimensional image data and a Z-value. The Z-value indicates the depth in the three-dimensional virtual space from the camera (view-point) used for the three-dimensional computer graphics. As an example, this first embodiment is explained for an animated dragon (also referred to as "dragon" in the following) as a three-dimensional object, and the background and a table arranged in the middle of the screen as two-dimensional image representations.

Figure 1:
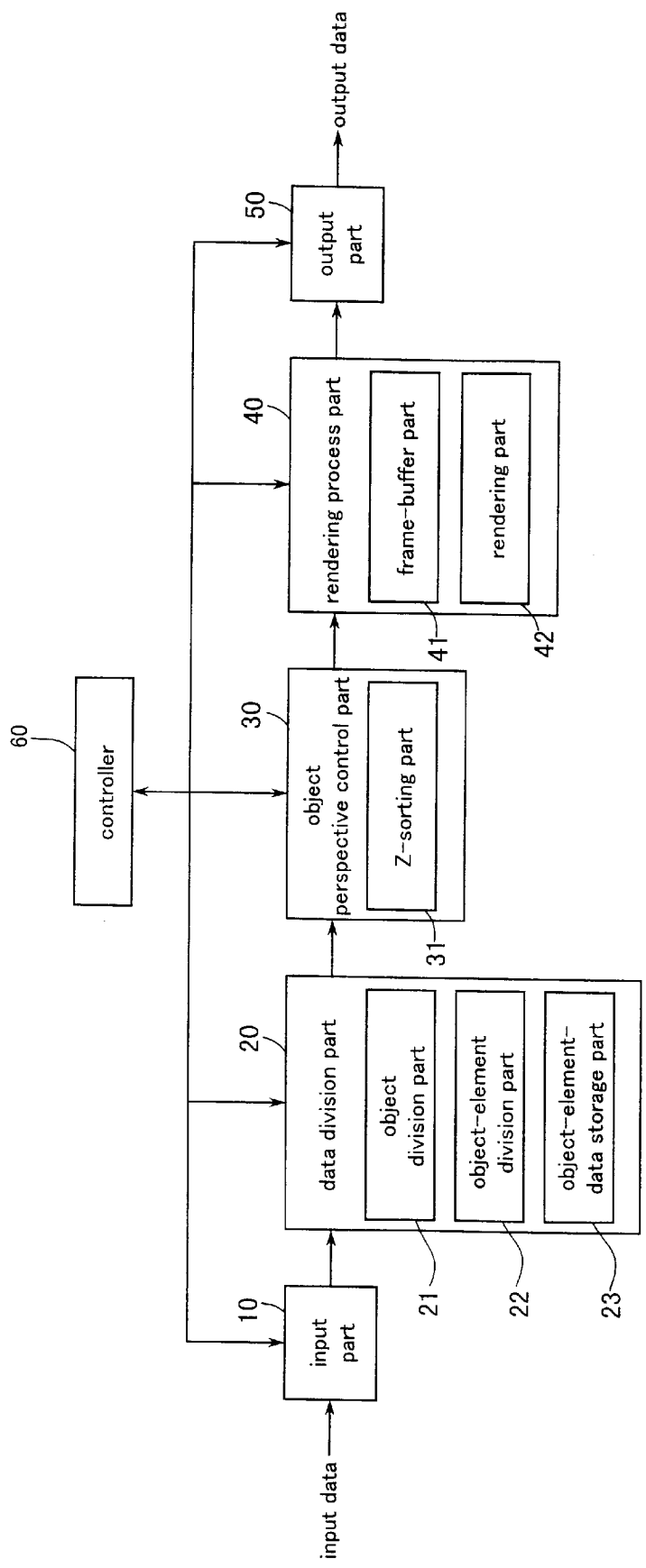
FIG. 1 is a diagram outlining the configuration of a three-dimensional graphics display system according to a first embodiment of the present invention.
Figure 2:
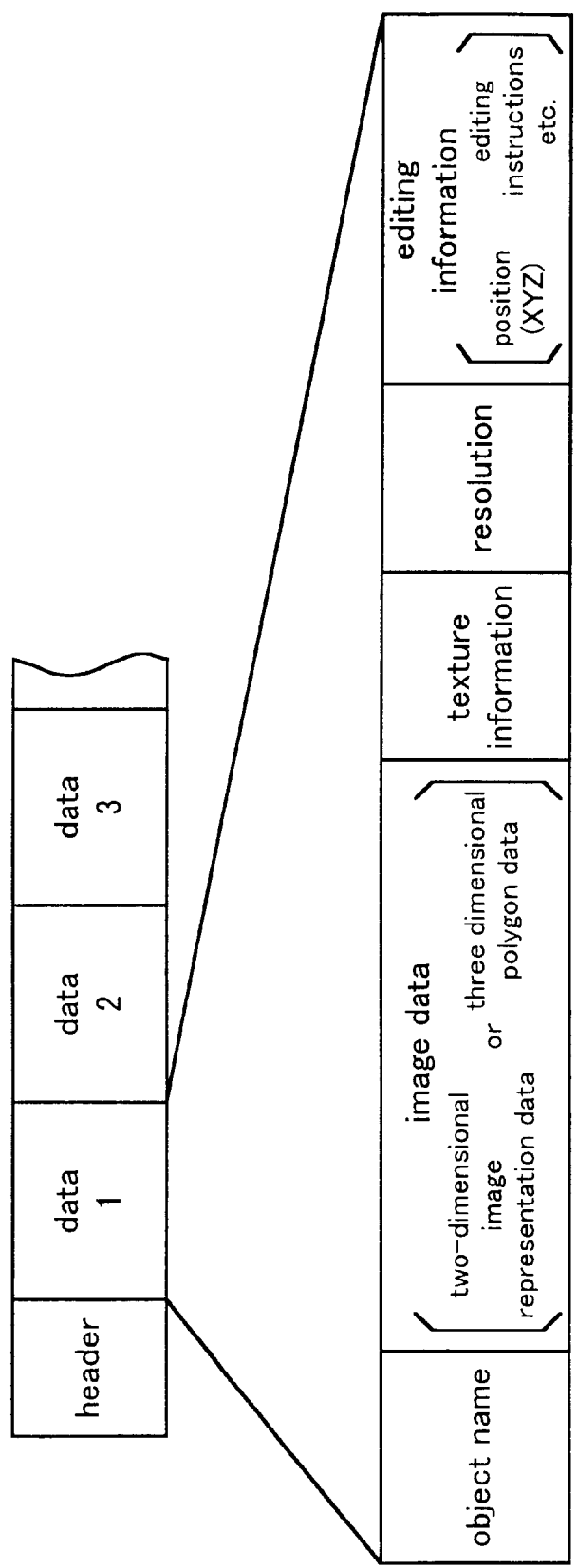
FIG. 2 shows the data structure of the data used in the three-dimensional graphics display system according to the first embodiment of the present invention.
Figure 3:
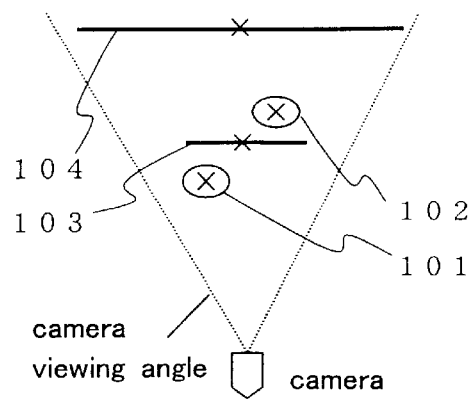
FIG. 3(a) illustrates the positional relation between the displayed objects.
FIG. 3(b) illustrates an example of the result of rendering these objects.
Figure 3:
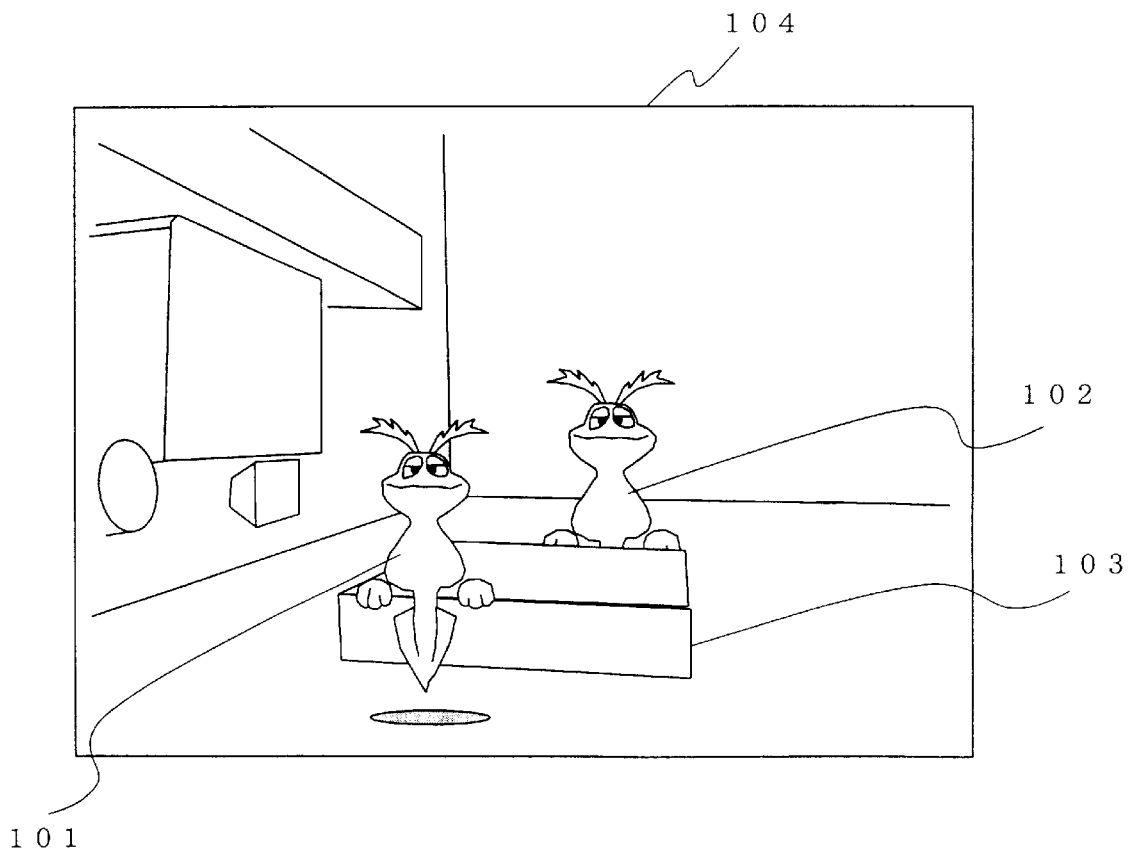
Figure 4:
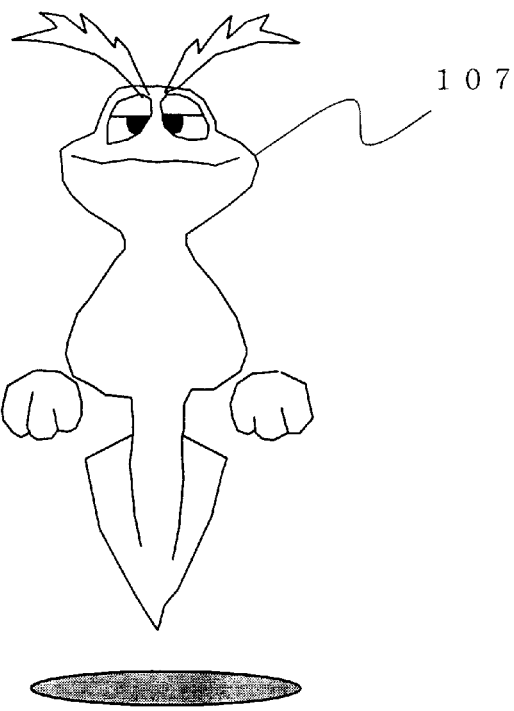
FIG. 4(a) is an example of an object representing an artificial dragon.
FIG. 4(b) illustrates an example of object elements.
Figure 4:
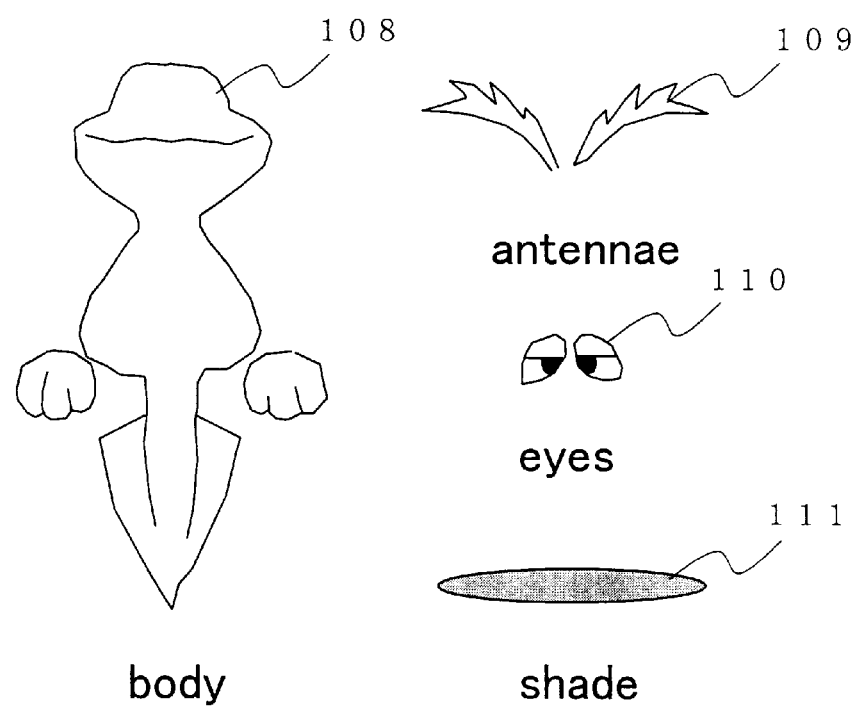

The following explanations refer to drawings illustrating an outline of the configuration of the entire three-dimensional graphics display system according to the first embodiment and an outline of the entire process-flow. FIG. 1 is a diagram outlining the configuration of this system. FIG. 2 shows the data structure of the data used in this system. FIG. 3 illustrates the positional relation between the displayed objects. FIG. 4 is a flowchart outlining the entire process-flow of this system.

As is shown in FIG. 1, a three-dimensional graphics display system according to the first embodiment of the present invention basically comprises a data input part 10, a data division part 20, an object perspective control part 30, a rendering process part 40, an output part 50, and a controller 60. Although it is not particularly indicated in the drawings, the system also comprises the necessary memory, and devices to control the system.

The data that is necessary for rendering a scene is entered into the data input part 10. FIG. 2 shows an example of the data structure that is entered into the data input part 10. As is shown in FIG. 2, the input data for all rendered objects includes, for example, an object name, three-dimensional polygon data or two-dimensional image representation data, a texture, and a resolution. In addition to this information, it includes editing information such as the object position (X, Y, Z), movement, and deformation instructions.

One important feature of this embodiment is the simultaneous representation of three-dimensional objects and two-dimensional images among the objects to be displayed. Also for the two-dimensional image representation objects, a Z-value is specified in addition to the two-dimensional image data. Thus, also the two-dimensional image representation objects are treated as objects with three-dimensional coordinates in three-dimensional space. This is illustrated in FIG. 3. FIG. 3(a) is an outline of the three-dimensional space seen from above. As is shown in FIG. 3(a), in addition to the three-dimensional objects (animated dragons 101 and 102), two-dimensional image representation objects (a table 103 and a background 104) are represented in the three-dimensional virtual space.

The data division part 20 comprises an object division part 21, an object-element division part 22, and an objectelement-data storage part 23. The object division part 21 sorts and divides the input data from the data input part 10 into the objects. The object-element division part 22 further sorts and divides the objects into object portions (referred to as "object elements" below) of rendering units, as necessary. A "rendering unit" refers to the consolidation into one rendering process. For example, the object 107 in FIG. 4(*a*), which is one of the dragons, is divided into the following object elements: body 108, antennae 109, eyes 110, and shadow 111. The object-element-data storage part 23 stores the divided object-element data.

The object perspective control part 30 comprises a Z-sorting part 31. It extracts and controls the perspective order between objects appearing on the scene and the viewpoint (camera). As will be explained below, it performs this process by sorting according to the Z values (referred to as "Z-sorting" below) with the Z-sorting part 31.

The rendering process part 40 controls the rendering process and correctly represents the overlapping of objects, based on the perspective order among objects, which is determined by the direction from the viewpoint and the object perspective control part 30. The rendering process part 40 comprises a frame-buffer part 41 and a rendering part 42.

The output part 50 outputs the frame data that has been edited for rendering. Together with other necessary information, the output data is then stored in a file or output on a display.

Figure 5:
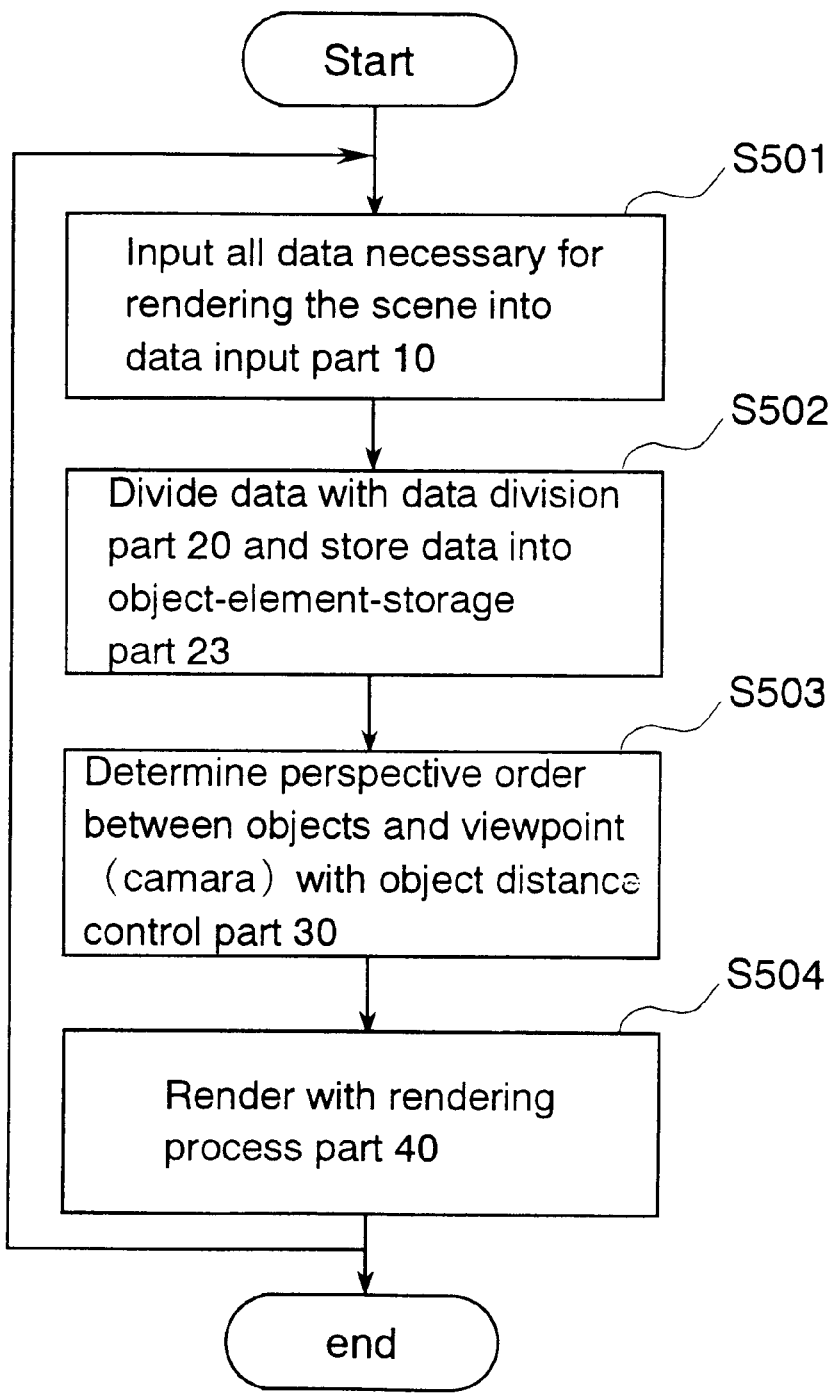
FIG. 5 is a flowchart outlining the entire process-flow of the three-dimensional graphics display system according to the first embodiment of the present invention.

The entire process flow of the inventive three-dimensional graphics display system can be outlined as follows:

First of all, all the necessary data for rendering the scene is entered into the data input part 10 (step S501 in FIG. 5). As an example of input data, all the data pertaining to the rendering objects shown in FIG. 2 is entered. The Z-value, which indicates the distance from the viewpoint, is assigned to three-dimensional objects or two-dimensional image representation objects.

Then, the data division part 20 classifies the entered data for all objects with the object division part 21. Moreover, it classifies the data into object elements with the object-element division part 22, and stores this data in the object-element-data storage part 23 (step S502). The input data is classified for example as shown in FIG. 4(*b*) and the objects for the dragon are divided into the object elements body 108, antennae 109 and eyes 110, which are three-dimensional objects, and the object element shadow 111, which is a two-dimensional object. The table 103 and the background 104 are divided into object elements for two-dimensional image data. Finally, all classified elements are stored.

Then, the object perspective control part 30 determines the perspective order of the objects obtained in step S502 from the viewpoint (camera) (step S503). Z-sorting is employed for this determination. As is shown in FIG. 2, a Z-value indicating the distance from the viewpoint is assigned to all object elements. The Z-sorting part 31 sorts the object elements in descending order of their Z-values. This Z-sorting ascertains the perspective order from the object elements that are furthest away from the viewpoint to those that are closest. "Perspective order" means the order of the object elements according to their distance from the viewpoint. In this example, the sorting order is: background 104, dragon 102, table 103 and dragon 101. With step S503, the perspective order of all objects, including both three-dimensional objects and two-dimensional image representation objects, can be determined.

Then, the rendering process part 40 correctly represents the overlapping of all objects according to their direction and perspective order from the viewpoint (step S504). The rendering process part 40 comprises a frame-buffer part 41 and renders the objects into the frame-buffer part 41 according to the Z-sorting order of step S503, starting with the furthest objects. In this example, the background 104, the dragon 102, the table 103, and the dragon 101 are rendered overlapping in this order in the frame-buffer part 41. Since the three-dimensional objects and the two-dimensional image representation objects are rendered simultaneously overlapping in the frame-buffer part 41, the perspective order and the overlapping between the three-dimensional objects and the two-dimensional image representation objects can be correctly represented. For each rendering in the frame-buffer part 41, the rendering part 42 performs the processing that is necessary for size adjustments according to the perspective (viewing angle), texture mapping, lighting etc.

FIG. 3(*b*) shows the result of this rendering. In this scene shown in FIG. 3(*b*), there is a background 104, the dragon 101 appears in front of the table 103, and the dragon 102 is hidden behind the table 103.

The steps S501–S504 are repeated if necessary. For serial scene rendering, it may be sufficient to enter only the differential data, that is, the data that is different from the previous frame, as input data for step S501.

This system configuration and process flow provide a three-dimensional graphics display system with joint use of two-dimensional image representations that can simultaneously represent and display three-dimensional objects and two-dimensional image representation objects.

Second Embodiment

The three-dimensional graphics display system of the second embodiment is a three-dimensional graphics display system with joint use of two-dimensional image representations. As in the first embodiment, it can simultaneously represent and display three-dimensional objects and two-dimensional image representation objects. However, in addition to that, it performs an exclusion control (collision control) between two-dimensional image representation objects and three-dimensional objects. In other words, if movable objects move through the three-dimensional virtual space, such a control becomes necessary when three-dimensional objects collide with two-dimensional image representation objects. By exclusively controlling the space that each object occupies, the virtual space can be displayed more naturally.

As an example illustrating the second embodiment, the dragons are three-dimensional objects, and the background and the table arranged in the middle of the screen are two-dimensional image representation objects. The following example explains the control when a dragon, which is a movable object moves forward and out of hiding from behind the table, which is a static object, and collides with the table. This control avoids unnatural movements, such as that the dragon hiding behind the table suddenly appears in front of the table.

The following explanations refer to drawings illustrating an outline of the configuration of the entire three-dimensional graphics display system according to the second embodiment and an outline of the entire process-flow on this system.

Figure 6:
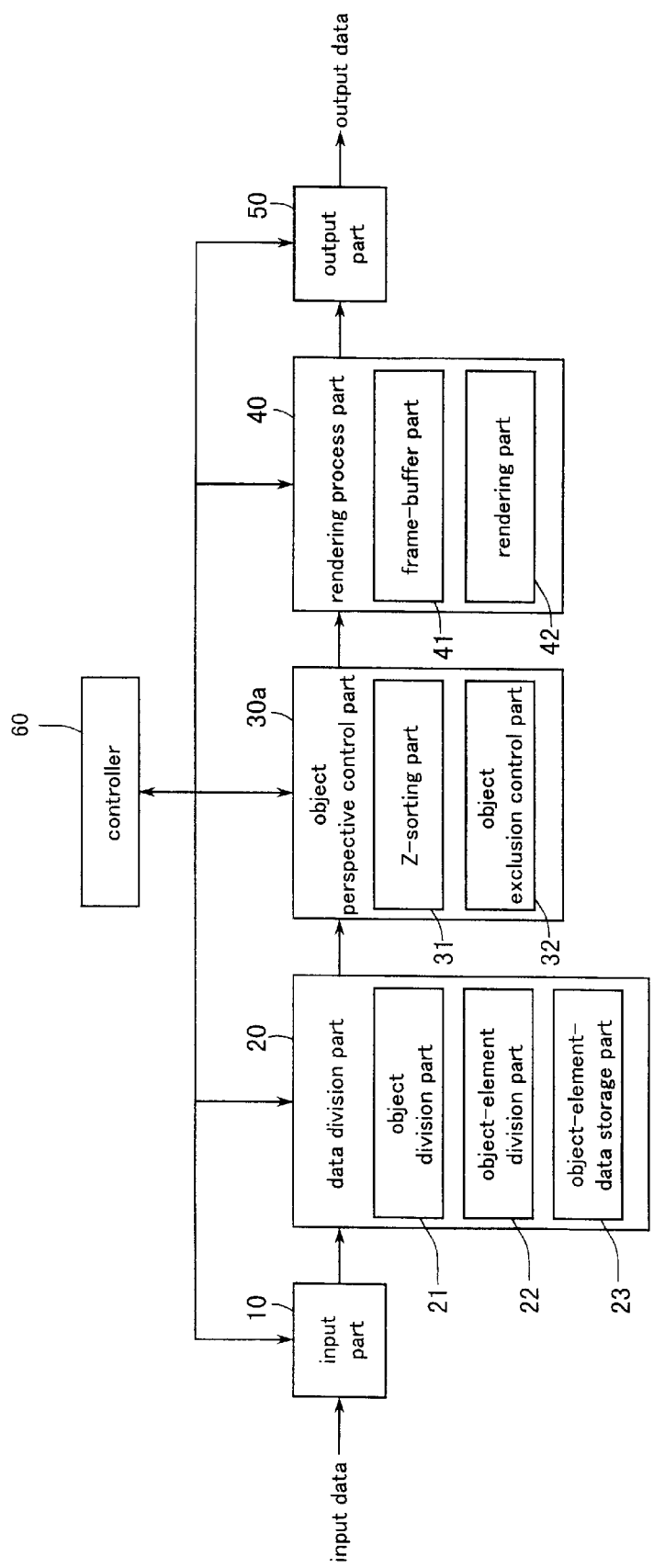
FIG. 6 is a diagram outlining the configuration of a three-dimensional graphics display system according to a second embodiment of the present invention.

FIG. 6 is a diagram outlining the configuration of the three-dimensional graphics display system according to the second embodiment. As is shown in FIG. 6, instead of the object perspective control part 30 of the first embodiment, the configuration of the second embodiment has an object perspective control part 30a, additionally comprising an object exclusion control part 32. Apart from the object perspective control part 30a, all elements with the same numbers are substantially the same as explained in the first embodiment, so that their explanation has been omitted. The following explanation concentrates on the object perspective control part 30a. As in the first embodiment, the system also comprises the necessary memory and devices to control the system, although these are not particularly indicated in the drawings.

The object perspective control part 30a comprises a Z-sorting part 31 and an object exclusion control part 32. The Z-sorting portion performs the Z-sorting of all objects, as has been explained for the first embodiment, so that its further explanation has been omitted.

The object exclusion control part 32 performs exclusion control in a manner that the Z-values of the objects are not allowed to overlap, and represents virtual collisions in the three-dimensional virtual space. To be specific, it checks whether Z-values overlap, as a result of the Z-sorting with the Z-sorting part 31. If Z-values overlap, a virtual collision in the three-dimensional virtual space can be represented by not renewing the Z-value of an object whose Z-value has been renewed over the previous frame data by a translation command, and thus preserving consistency of the three-dimensional virtual space.

Figure 7:
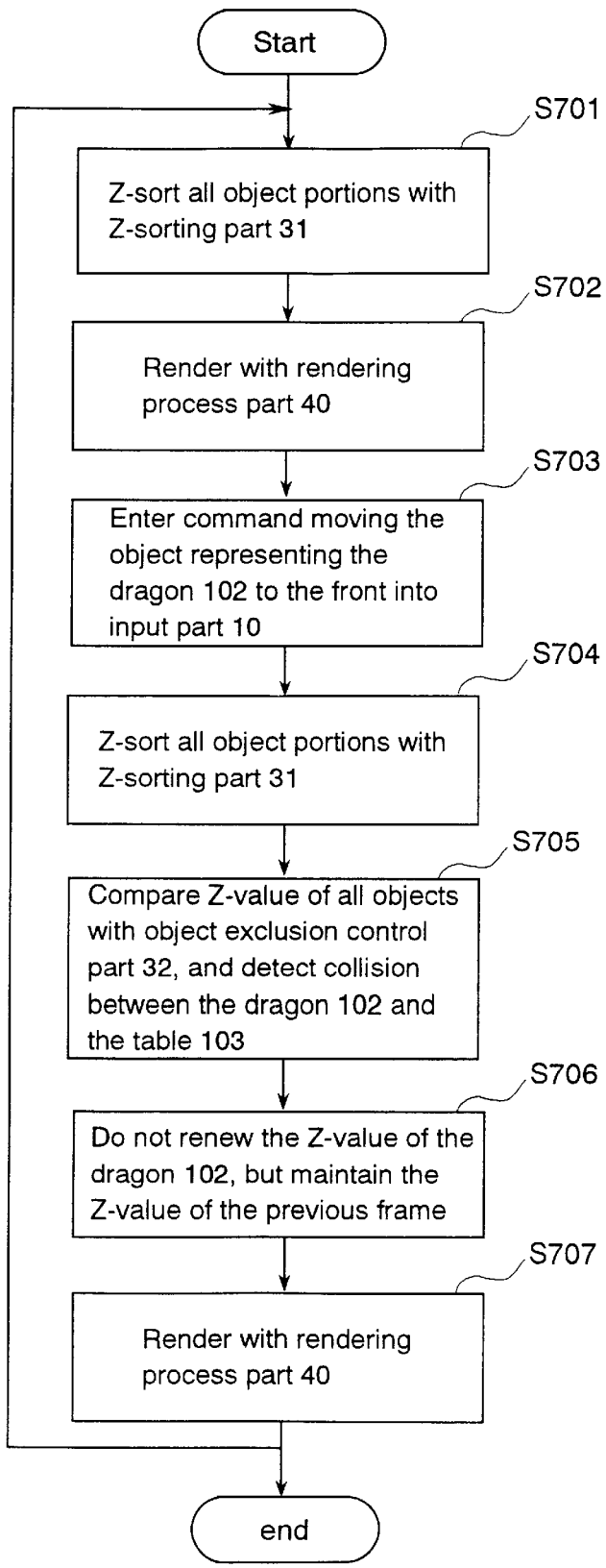

FIG. 7 illustrates the processing steps of the object perspective control part 30a. The processing steps of all parts besides the object perspective control part 30a are substantially the same as the processing steps illustrated by FIG. 4 for the first embodiment, so that their explanation has been omitted.

As a precondition, as in the first embodiment, all input data for the objects has been entered into the input part 10, and the data division part 20 has divided and stored the object portions for each object element.

First, the Z-sorting part 31 of the object perspective control part 30a Z-sorts all object portions (step S701). In this example, as the result of the Z-sorting, there are no objects with overlapping Z-values. As in the first embodiment, the rendering process part 40 performs the rendering processing, and the data is output from the output part 50 (step S702). The Z-values of the dragon 102 and the table 103 are different, but since the X- and Y-values overlap partly, there is a perspective order between them on the screen, and there is an overlap when seen from the front. The object perspective control part 30a, stores the Z-value of each object. As in the first embodiment, the displayed result is as shown in FIG. 5.

Assuming that in step S703 a command moving the object representing the dragon 102 to the front is entered into the input part 10, the entered command renews the Z-value and makes it smaller.

Then, the Z-sorting part 31 of the object perspective control part 30a Z-sorts all object portions again (step S704). In this example, as a result of renewing the Z-value of the dragon 102, the Z-value of the dragon 102 and the table 103 overlap, or the order of the Z-values is reversed (that is, if, for example, before the renewal, the Z-value of the dragon 102 is larger than the Z-value of the table 103, then after the renewal, the Z-value of the table is larger than that of the dragon 102).

The object exclusion control part 32 compares the Z-value of all objects, to check for overlap or reversal, and a virtual collision between the dragon 102 and the table 103 in the three-dimensional virtual space is detected (step S705).

The object exclusion control part 32 does not renew the Z-value of the dragon 102 in the object perspective control part 30a, but instructs it to maintain the stored Z-value of the previous frame (step S706). The object perspective control part 30a keeps the Z-value of the previous frame as the Z-value of the dragon 102, and transmits this processing data to the rendering process part 40. Then, the rendering processing and output processing is performed (step S707).

With these steps S701–S707, virtual collisions between objects in the three-dimensional virtual space can be represented, and unnatural movements, such as that a dragon hiding behind the table suddenly appears in front of it, can be avoided.

If at the beginning of a scene, for example directly after switching into a scene, Z-values of objects are already overlapping, in other words if the result of the Z-sorting in step S701 is that there are objects with overlapping Z-values, then the object exclusion control part 32 can forcibly reduce or augment the Z-value of such three-dimensional movable objects to resolve the Z-value overlap. In the second embodiment for example, the Z-value is forcibly reduced, and the dragon 102, which is a three-dimensional movable object is displayed in front of the table, which is represented as a two-dimensional image and is a static object.

According to the second embodiment explained above, if for example a dragon, which is a movable object, moves forward from hiding behind the table, which is a static object, the exclusion control is based on the Z-value. Thus, a three-dimensional graphics display system with joint use of two-dimensional image representations can be realized, that avoids unnatural movements, such as that a dragon hiding behind the table suddenly appears in front of it.

Third Embodiment

The three-dimensional graphics display system of the third embodiment is a three-dimensional graphics display system with joint use of two-dimensional image representations, and as in the first and the second embodiment, it can simultaneously represent and display two-dimensional image representation objects and three-dimensional objects. In addition to that, it does not treat two-dimensional image representation objects permanently as static objects, but, depending on the scene, can switch their representation to three-dimensional objects. In other words, in regular scenes, such an object is displayed as a static, two-dimensional image representation object, but under certain conditions, it is switched into a movable three-dimensional object.

In the following, objects that are treated permanently as static objects, regardless of the conditions, are called "fix objects". Examples for such objects are the table 103 or the background 104. On the other hand, objects that, according to certain conditions, can be switched from static objects to movable three-dimensional objects are called "unfix objects". An example for such an object is a vase 106.

The following explanations refer to drawings illustrating an outline of the configuration of the entire three-dimensional graphics display system according to the third embodiment and an outline of the entire process-flow on this system.

Figure 8:
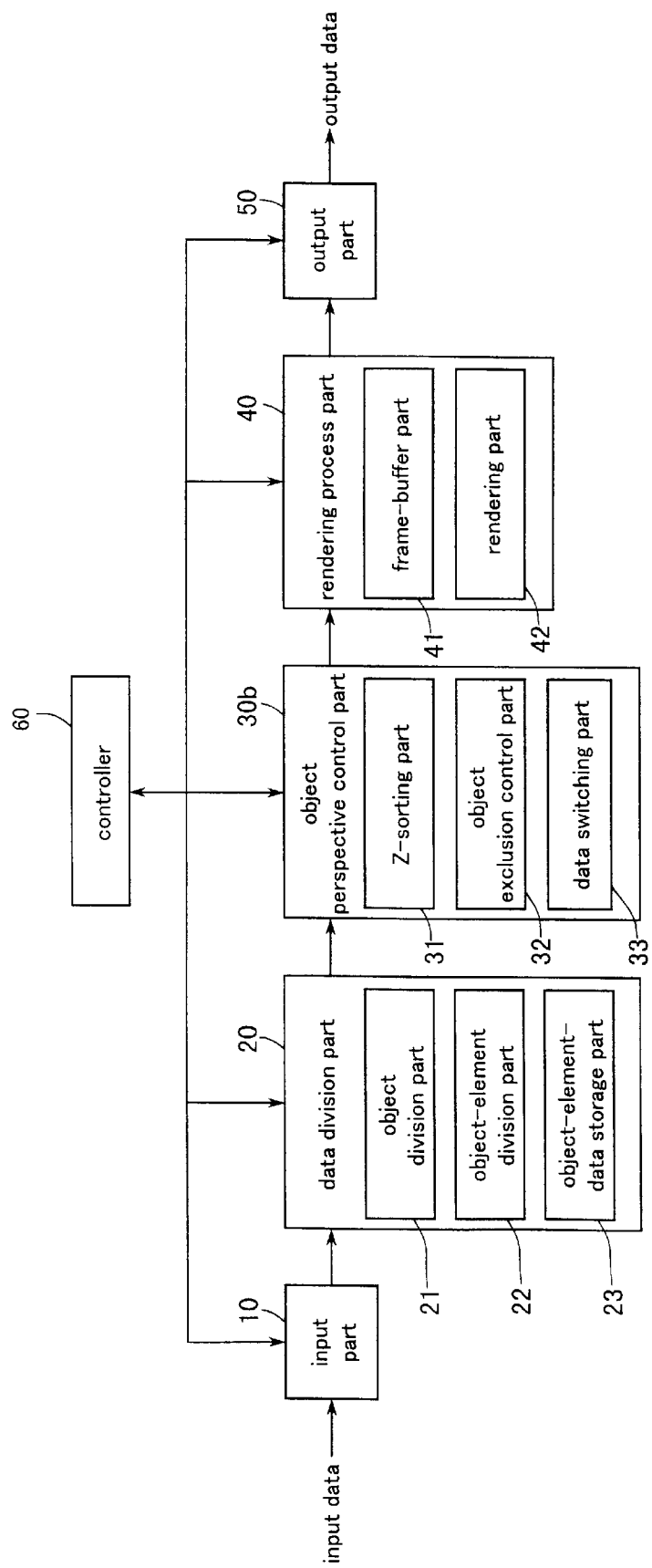
FIG. 8 is a diagram outlining the configuration of a three-dimensional graphics display system according to a third embodiment of the present invention.

FIG. 8 is a diagram outlining the configuration of the three-dimensional graphics display system according to the third embodiment. As is shown in FIG. 8, instead of the object perspective control part 30 of the first embodiment, the configuration of the third embodiment has an object perspective control part 30b. Apart from the object perspective control part 30b, all elements with the same numbers are substantially the same as explained in the first embodiment, so that their explanation has been omitted. The following explanation concentrates on the object perspective control part 30b. As in the first embodiment, the system also comprises the necessary memory, and devices to control the system, although these are not particularly indicated in the drawings.

The object perspective control part 30b comprises a Z-sorting part 31, an object exclusion control part 32, and a data switching part 33. The Z-sorting portion 31 performs the Z-sorting of all objects, as has been explained for the first embodiment, so that its further explanation has been omitted.

The object exclusion control part 32 performs exclusion control in a manner that the Z-values of the objects do not overlap, and represents virtual collisions in the three-dimensional virtual space. It checks whether, as a result of the Z-sorting of the Z-sorting part 31, Z-values overlap. If the Z-values of a three-dimensional object and a fix object overlap, it performs an exclusion control as explained for the second embodiment. If the Z-values of a three-dimensional object and an unfix object overlap, it orders a switch to the data switching part 33.

The data switching part 33 follows the instructions of the object exclusion control part 32. The data switching part is the portion that controls the switching of a two-dimensional image representation object that is represented as a static object into a movable three-dimensional object.

Figure 9:
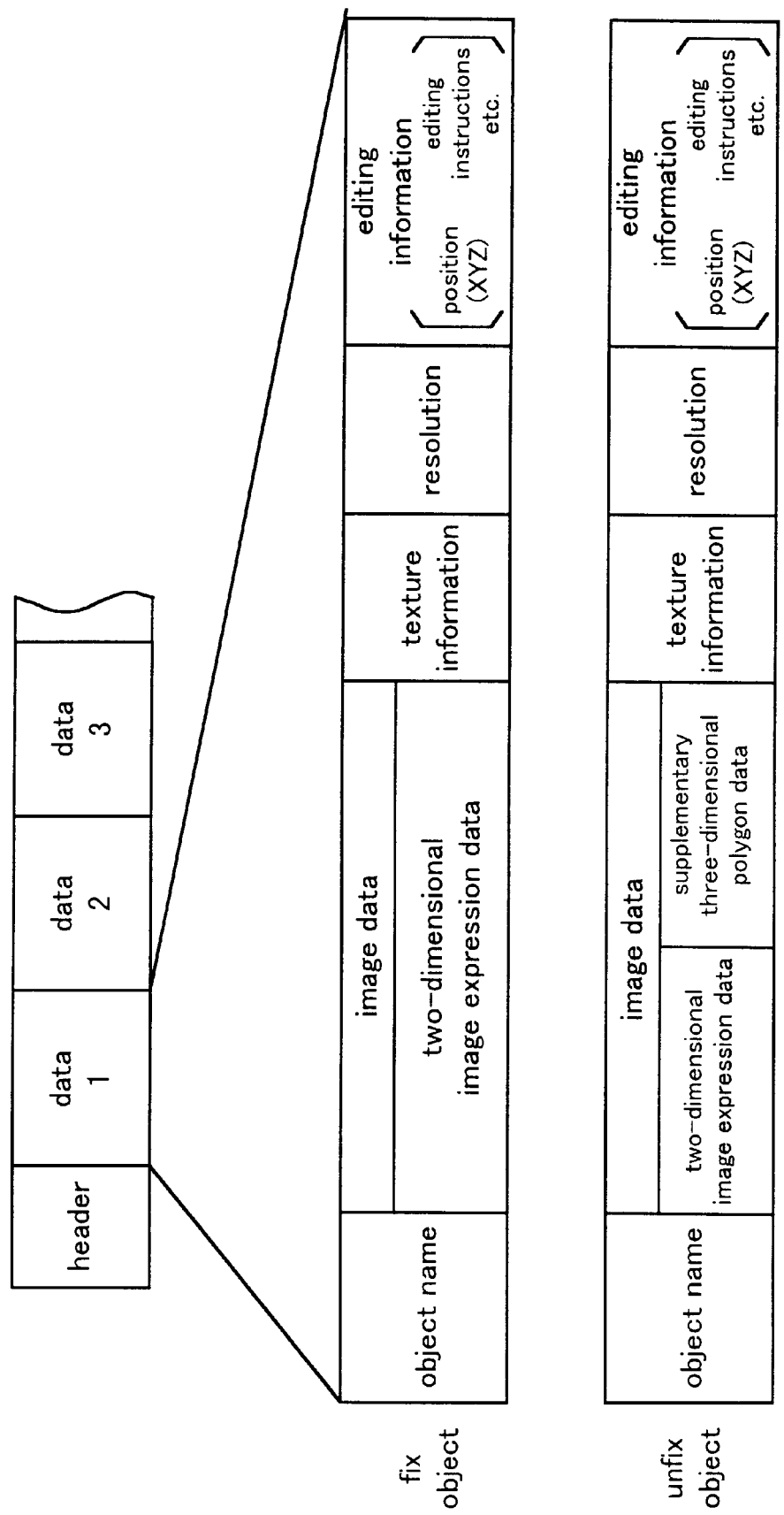
FIG. 9 shows the data structure of the data used in the three-dimensional graphics display system according to the third embodiment of the present invention.

FIG. 9 shows the data structure of the data that is used in the system of the third embodiment. As is shown in FIG. 9, an unfix object comprises two types of data: two-dimensional image representation data and supplementary three-dimensional polygon data. The two-dimensional image representation data is used by default, and the data switching part 33 switches to the supplementary three-dimensional polygon data.

Figure 10:
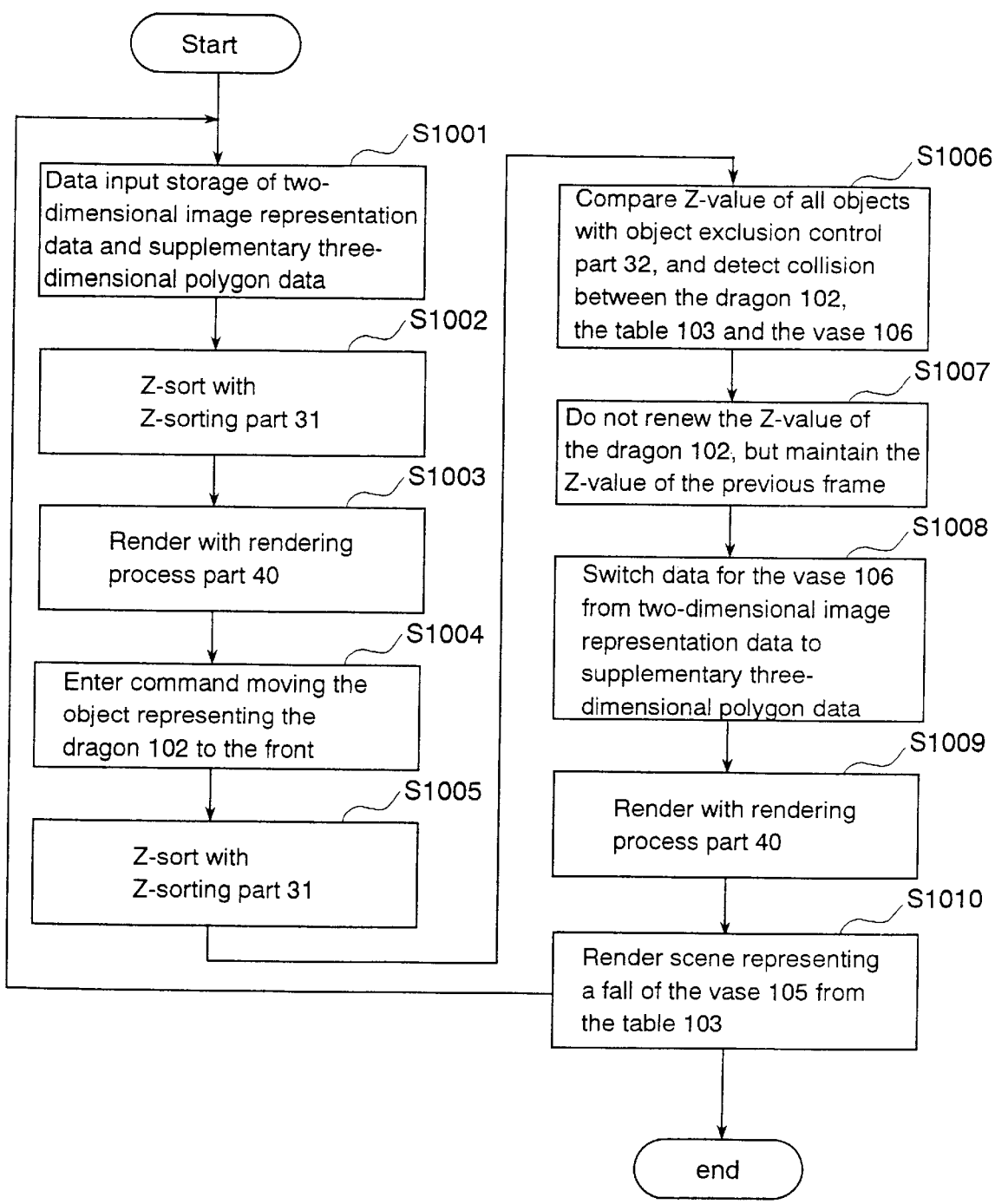
FIG. 10 is a flowchart outlining the process steps of the object perspective control part 30b.

FIG. 10 illustrates the processing steps of the object perspective control part 30b. The processing steps of all parts besides the object perspective control part 30b are substantially the same as the processing steps illustrated by FIG. 4 for the first embodiment, so that their explanation has been omitted.

First, all input data, as shown in FIG. 9, for the objects is entered into the input part 10, and the data division part 20 divides and stores the object portions for each object element. For unfix objects, both two-dimensional image representation data and supplementary three-dimensional polygon data is given, but by default the two-dimensional image data becomes the main data, and the supplementary three-dimensional polygon data is stored (step S1001).

Figure 11:
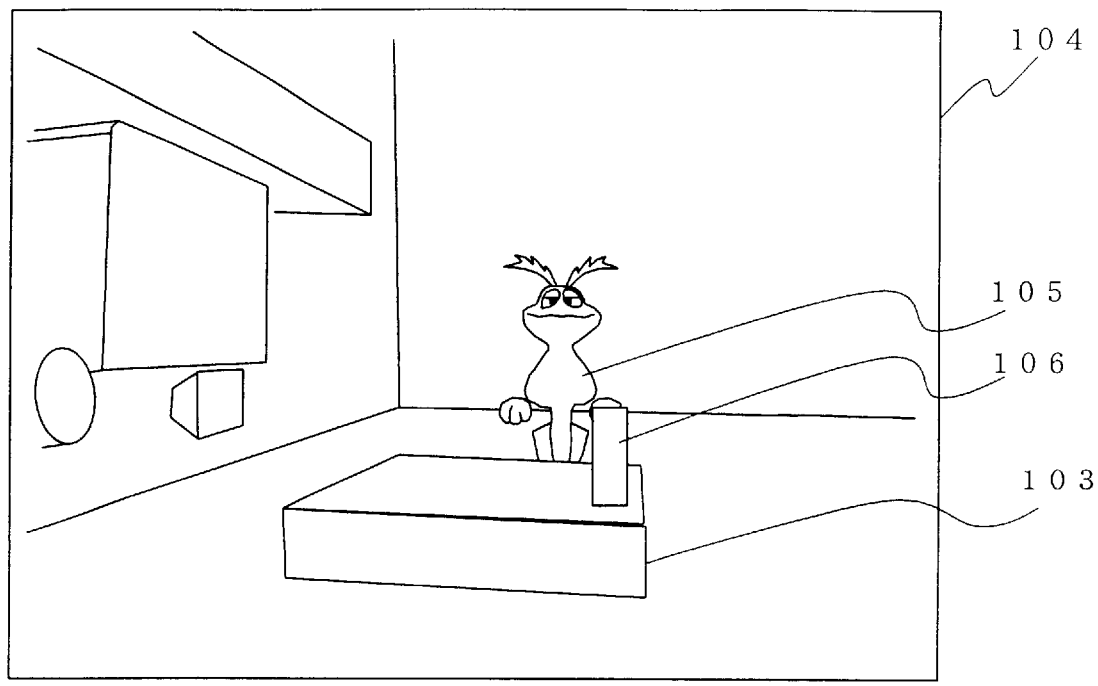
FIGS. 11(a) and (b) illustrate examples of the result of rendering the objects.
Figure 11:
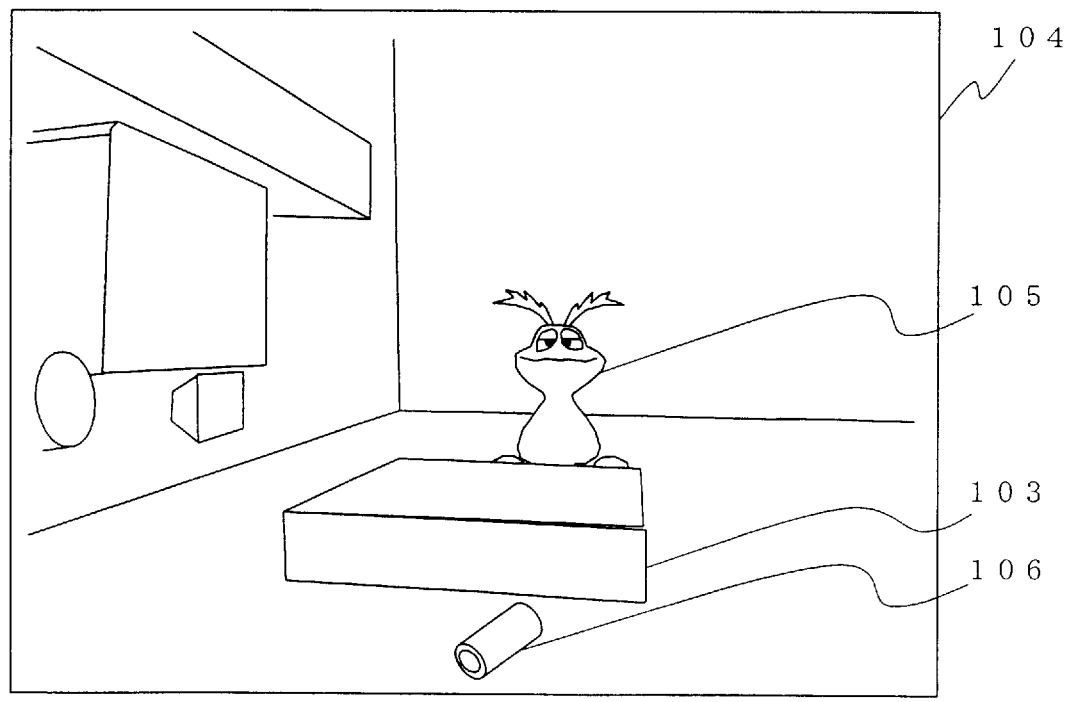

Then, the Z-sorting part 31 of the object perspective control part 30b Z-sorts the object portions (step S1002). If, as a result of the Z-sorting, there are no objects with overlapping Z-values, the procedure advances to step S1003, and, as in the first embodiment, the rendering process part 40 performs the rendering processing, and the data is output from the output part 50. Here, the X- and Y-values of the dragon 105, the table 103, and the vase 106 overlap partly, so there is a perspective order between them on the screen, and there is a display overlap. The object perspective control part 30b, stores the Z-value of each object. The displayed result is as shown in FIG. 11(a).

Assuming that in step S1004 a command moving the object representing the dragon 105 to the front is entered into the input part 10, then the entered command renews the Z-value and makes it smaller.

Then, the Z-sorting part 31 of the object perspective control part 30b Z-sorts all object portions again (step S1005). In this example, as a result of renewing the Z-value of the dragon 105, the Z-value of the dragon 105 and the Z-values of the table 103 and the vase 106 overlap, or the size of the Z-values are reversed.

The object exclusion control part 32 compares the Z-value of all objects to check for overlap or reversal, and a virtual collision in the three-dimensional virtual space between the dragon 105 on the one hand and the table 103 and the vase 106 on the other hand is detected (step S1006).

For the table, which is a fix object, the object exclusion control part 32 does not renew the Z-value of the dragon 105 in the object perspective control part 30b, as in the second embodiment, but instructs it to maintain the stored Z-value of the previous frame (step S1007). The data switching part 33 orders the object exclusion control part 32 to switch the data representation for the vase 106, which is an unfix object. The data switching part 33 switches the data for the vase 106 from two-dimensional image representation data to supplementary three-dimensional polygon data (step S1008).

The object perspective control part 30b keeps the Z-value of the previous frame as the Z-value of the dragon 105, and transmits this processing data to the rendering process part 40. Then, the rendering processing and output processing are performed (step S1009).

If the story develops in a manner that, in the next frame of the scene, the vase 106, which has been turned into a three-dimensional object, drops from the table 103 as a result of the virtual collision with the dragon 105, a more natural three-dimensional virtual space can be represented. The vase 106 has been switched into three-dimensional polygon data, so that its fall from the table 103 can be represented by changing its orientation and position (step S1010). As a result from changing the representation of the vase 106 into a three-dimensional object and colliding with the dragon 105, a scene is represented where the vase 106 has fallen from the table 103, as shown for example in FIG. 11(b).

Thus, according to the third embodiment, a virtual collision between objects in the three-dimensional virtual space can be represented.

Unfix objects can be represented as static two-dimensional image representation objects in regular scenes, or, as necessary, as movable three-dimensional objects. Thus, the data amount can be reduced and the processing speed increased. Moreover, a three-dimensional graphics display system with joint use of two-dimensional image representations that represents the three-dimensional virtual space more naturally can be realized.

Fourth Embodiment

The three-dimensional graphics display system of the fourth embodiment is a three-dimensional graphics display system with joint use of two-dimensional image representations. However, in this fourth embodiment, the configuration of objects as individual characters, such as artificial creatures, is such that three-dimensional object portions and two-dimensional image representation object portions can be simultaneously represented. Moreover, the data structure of the objects comprises relational information indicating the relation among the object portions within an object. In other words, a character is divided into object elements, and three-dimensional polygon data is assigned to the object elements corresponding to three-dimensional graphics representations, whereas two-dimensional image representation data is assigned to the object elements corresponding to two-dimensional image representations. Moreover, relational information concerning the positional relation among the object elements is given as object-portion-relation information. In the fourth embodiment, the displayed objects can be for example animated dragons. Object elements represented by three-dimensional graphics representations are the dragon's body, antennae and eyes, whereas object elements represented by two-dimensional image representation include the dragon's shadow. The object-portion-relation information is the position of the dragon's antennae, eyes and shadow with relation to the dragon's body.

The following explanations refer to drawings illustrating an outline of the configuration of the entire three-dimensional graphics display system according to the fourth embodiment and an outline of the entire process-flow on this system.

Figure 12:
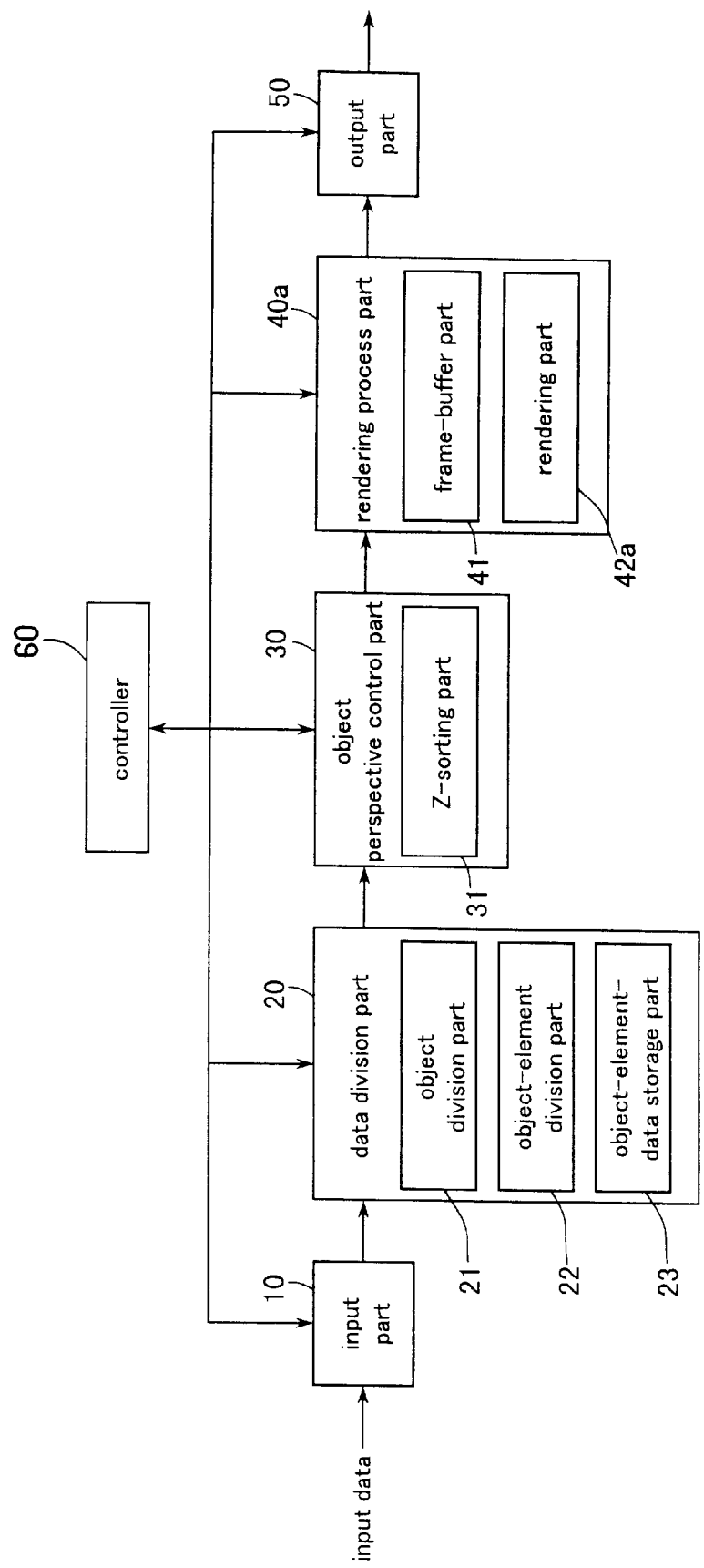
FIG. 12 is a diagram outlining the configuration of a three-dimensional graphics display system according to a fourth embodiment of the present invention.

FIG. 12 is a diagram outlining the configuration of the three-dimensional graphics display system according to the fourth embodiment. As is shown in FIG. 12, instead of the rendering process part 40 of the first embodiment, the configuration of the third embodiment has a rendering process part 40a. Apart from the rendering process part 40a, all elements with the same numbers are substantially the same as explained in the first embodiment, so that their explanation has been omitted. The following explanation concentrates on the rendering process part 40a. As in the first embodiment, the system also comprises the necessary memory, and devices to control the system, although these are not particularly indicated in the drawings.

Figure 13:
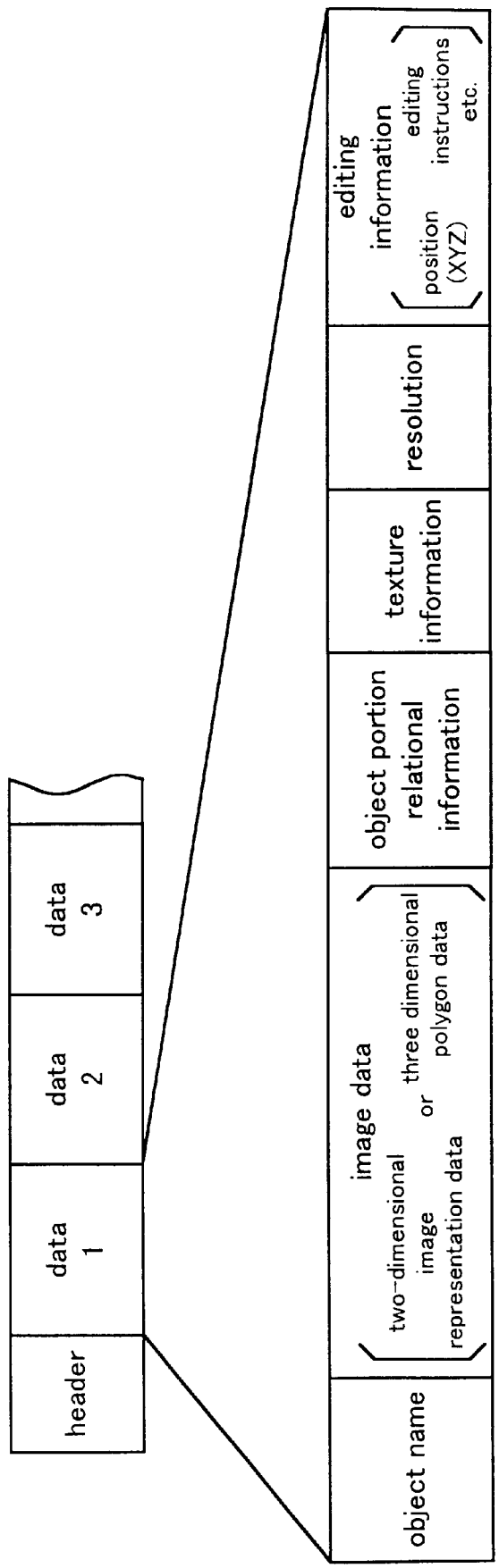
FIG. 13 shows the data structure of the data used in the three-dimensional graphics display system according to the fourth embodiment of the present invention.

The data that is necessary for rendering a scene is entered into the data input part 10. FIG. 13 shows an example of the data structure for the data input. As is shown in FIG. 13, the input data for all rendered objects includes information such as an object name, names of rendered portions, three-dimensional polygon data, two-dimensional image representation data, object-portion-relation information, positions (X, Y, Z), texture, and resolution. In addition to this information, it includes editing information such as movement and deformation instructions. One important feature of this embodiment is that the data for one object has three-dimensional polygon data and two-dimensional image representation data simultaneously represented. Moreover, the relation of the object portions is specified by relational information.

Figure 14:
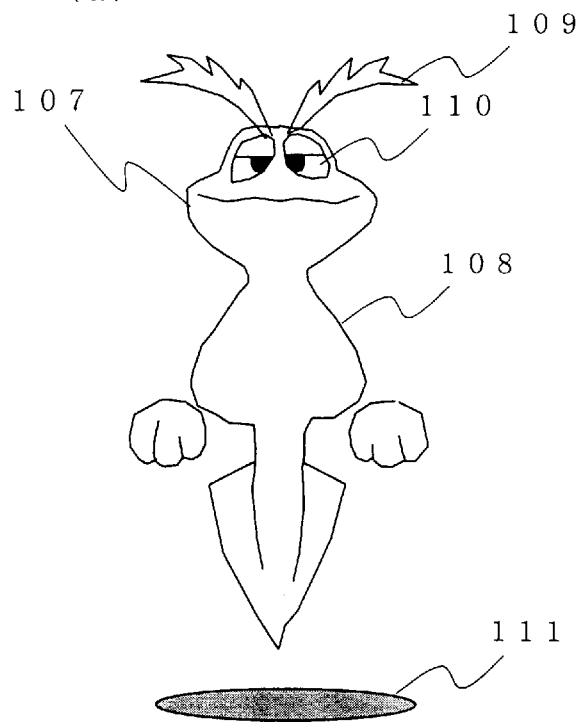
FIGS. 14(a) and (b) show the positional relation between the displayed objects.
Figure 14:

FIG. 14(a) shows the positional relation between the displayed objects. As is shown in FIG. 14(a), body 108, antennae 109 and eyes 110 of the dragon 107 are given as three-dimensional objects, whereas the shadow 111 is given as a two-dimensional image representation object. The positions of the antennae 109 and the eyes 110 are given as the relative positions from the position of the body 108, as measured from a certain position of the head. Similarly, the position of the shadow 111 is also given as the relative position from the body 108, as measured from a certain position of the feet.

The data division part 20 comprises an object division part 21, an object-element division part 22, and an object-element-data storage part 23. It divides and stores the object-element data. In this example, the input data of the dragon 107 is divided into the object elements body 108, antennae 109, eyes 110, and shadow 111. The object-element-relation information is also divided and stored according to the object elements.

The object perspective control part 30 comprises the Z-sorting part 31, and controls the perspective among the objects appearing in a scene.

The rendering process part 40a comprises a frame-buffer part 41 and a rendering part 42a.

The rendering part 42a follows the instructions of the object perspective control part 30. The rendering part 42a controls the rendering process, which correctly represents the overlapping of objects and is based on the perspective order among objects, which is determined by the direction from the viewpoint and the object perspective control part 30. During the rendering, the rendering part 42a controls the rendering process of the divided object elements, and renders them as one composite object into the frame-buffer part 41.

Figure 15:
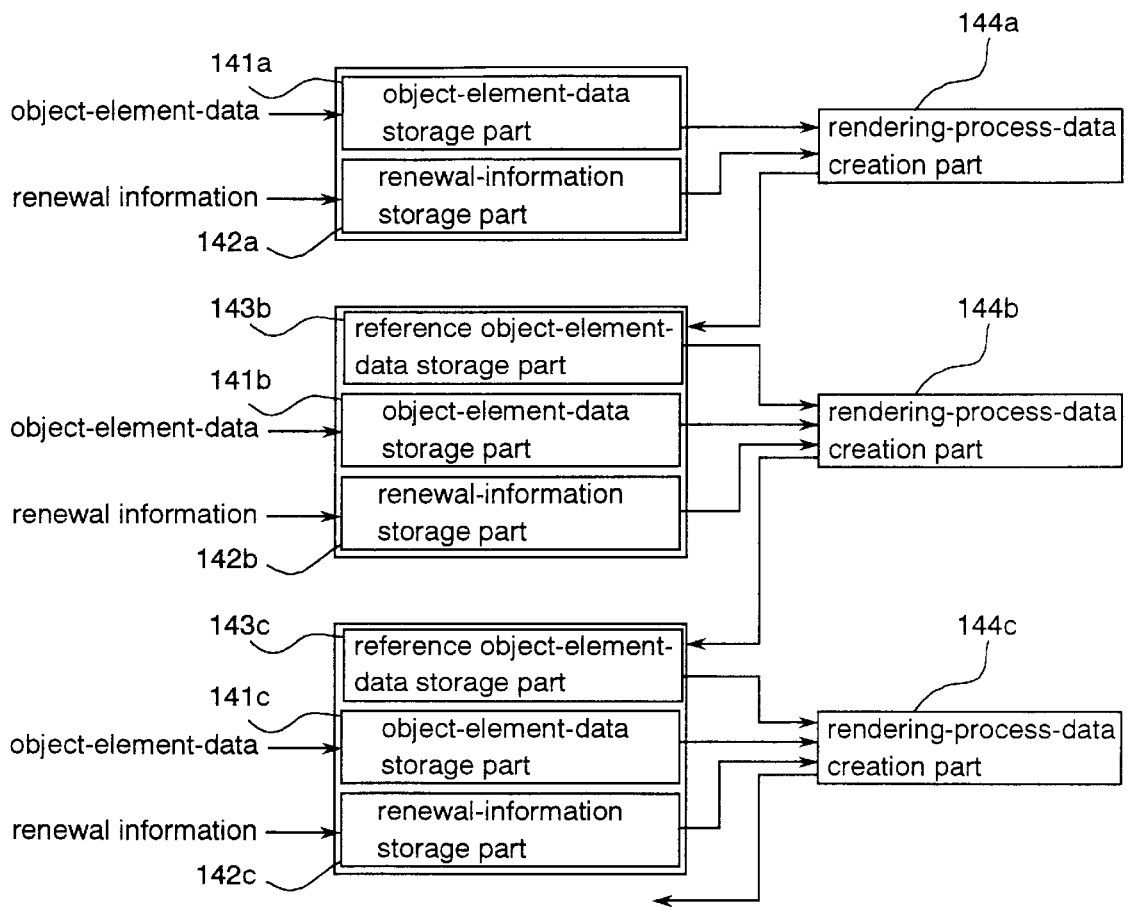
FIG. 15 outlines the data flow in the rendering part 42a when the object-element data is renewed.

FIG. 15 outlines the data-flow of the object-element data of the rendering part 42a and the data at renewal time. The object elements comprise object-element-data storage parts 141a–141c, renewal-information storage parts 142a–142c, reference object-element-data storage parts 143b–143c, and rendering-processing-data creation parts 144a–144c. The object-element data is divided by the data division part 20, entered into the rendering part 42a, and stored into the object-element-data storage parts 141a–141c. Moreover, when renewal information is given, it is stored into the renewal-information storage parts 142a–142c. The data from the object-element-data storage parts 141a–141c and the renewal-information storage parts 142a–142c is entered into the rendering-processing-data creation parts 144a–144c, and the rendering processing data for writing into the frame-buffer part 41 is created. A part of the rendering processing data is entered into the reference object-element-data storage parts 143b–143c, and used for the processing of the object-relation information in the other object elements.

Thus, the rendering processing data for each object element is created based on the data in the object-element-data storage parts 141a–141c, the renewal-information storage parts 142a–142c, and the reference object-element-data storage parts 143b–143c, and written into the frame-buffer part 41 combined into one object.

FIG. 15 shows three sets including an object-element-data storage parts, a renewal-information storage part, a reference object-element-data storage part, and a rendering-processing-data creation part for processing the object-element data. However, the invention is of course not limited to three sets, and it is possible to increase the number of object elements that can be processed by appropriately providing the number of necessary sets.

The output part 50 outputs the frame data that has been edited for rendering. Then, the output data is combined with necessary information and stored in a file or output on a display.

Figure 16:
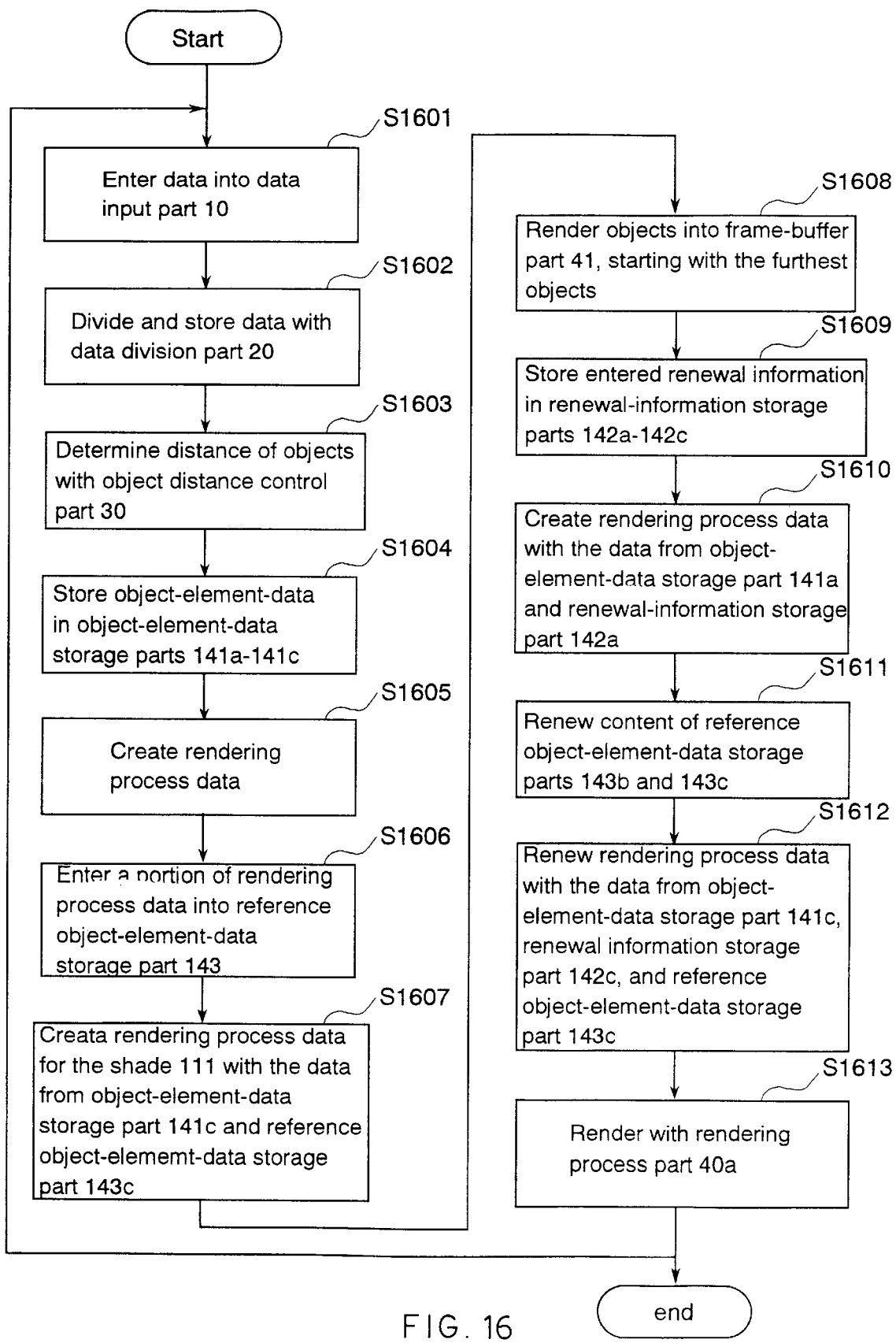
FIG. 16 is a flowchart outlining the entire process-flow of the three-dimensional graphics display system according to the fourth embodiment of the present invention.

FIG. 16 illustrates the process flow of an entire three-dimensional graphics display system according to the fourth embodiment.

First, the input data for all objects is entered into the input part 10 (Step S1601 in FIG. 16). In this example, the data of a dragon 107 having the data structure shown in FIG. 13 is entered.

Then, the data division part 20 divides the input data into the rendering portions and stores them (step S1602). In this example, the dragon 107 is classified into body 108, antennae 109, eyes 110 and shadow 111, and three-dimensional polygon data, two-dimensional image data, and object-portion-relation information etc. is assigned to them. For example, as positional information, the absolute position $(X_a, Y_a, Z_a)$ is given for the body 108, and the relative positions $(X_a+\alpha 1, Y_a+\beta 1, Z_a+\gamma 1)$ are given for the antennae 109 and the eyes 110. $\alpha$, $\beta$, and $\gamma$ express the relative position to the body 108. The positional information of the shadow 111 is similarly given as (Xa+α2, Ya+β2, Za+γ2).

Then, the object perspective control part 30 determines the perspective order of objects that has been attained in step S1602 from the viewpoint (step S1603).

Then, the rendering process part 40a performs rendering processing (step S1604–S1613).

First, the rendering process part 40a receives the object-element data, as shown in FIG. 15, and stores it in the object-element-data storage parts 141a–141c (step S1604). The object-element-data for the body 108 of the dragon is stored in the object-element-data storage part 141a, the object-element data for the antennae 109 is stored in the object-element-data storage part 141b, and the object-element data for the shadow 111 is stored in the object-element-data storage part 141c. The data in the object-element-data storage parts 141a and 141b is three-dimensional polygon data, and the data in the object-element-data storage part 141c is two-dimensional image representation data.

When there is no renewal information, the rendering-processing-data creation part 144a creates the rendering process data of the body 108 with the data in the object-element-data storage part 141a (step S1605).

Then, a portion of the rendering process data from the rendering-process-data creation part 144a is input into the reference object-element-data storage parts 143b and 143c (step S1606). Here, the positional information (Xa1, Ya1, Za1) of the body 108 is used for this input.

When there is no renewal information, the rendering-process-data creation part 144b creates the rendering process data for the antennae 109 from the data in the object-element-data storage part 141b and the reference object-element-data storage part 143b, and the rendering-process-data creation part 144c creates the rendering process data for the shadow 111 from the data in the object-element-data storage part 141c and the reference object-element-data storage part 143c (step S1607). The positional information for the antennae is given by (Xa+α1, Ya+β1, Za+γ1), and the positional information for the shadow 111 by (Xa+α2, Ya+β2, Za+γ2). The reference object-element data is (Xa1, Ya1, Za1), so that the positional information of the created rendering process data becomes (Xa+α1, Ya+β1, Za+γ1) for the antennae, and (Xa+α2, Ya+β2, Za+γ2) for the shadow.

Based on the rendering process data obtained in step S1607, the rendering part 42a renders the objects into the frame-buffer part 41 in the Z-sorting order of step S1605, starting with the furthest objects (step S1608). For each rendering into the frame-buffer part 41, the rendering part 42 performs the other processing that is necessary for texture mapping, lighting etc.

When there is renewal information, it is first stored in the renewal-information storage parts 142a–142c (step S1609). In this example, the renewal information about a movement of the body 108 of the dragon 107 in the direction of the X-axis from Xa1 to Xa2, and a transformation of the body 108 causing a tilt of the head is stored into the renewal-information storage part 142a.

The rendering-process-data creation part 144a creates the rendering process data from the data in the object-element-data storage part 141a and the renewal-information storage part 142a (step S1610). In this example, the positional information of the body is renewed to Xa2, Ya1, Za1).

The content of the reference object-element-data storage parts 143b and 143c is renewed (step S1611). In this example, it is renewed to (Xa2, Ya1, Za1).

The rendering-process-data creation part 144b renews the rendering process data from the data in the object-element-data storage part 141b, the renewal-information storage part 142b, and the reference object-element-data storage part 143b, and the rendering-process-data creation part 144c renews the rendering process data from the data in the object-element-data storage part 141c, the renewal-information storage part 142c, and the reference object-element-data storage part 143c (step S1612).

Based on the rendering process data obtained in steps S1611 and S1612, the rendering part 42a performs the necessary processing with the frame-buffer part 41 and renders the objects (step S1613). FIG. 14(b) shows the result of the object rendering.

Steps S1601–S1613 can be repeated as necessary.

With this system configuration and process flow, a three-dimensional graphics display system with joint use of two-dimensional image representations can be realized, that can simultaneously represent three-dimensional graphics representations and two-dimensional image representations to display the elements of one object.

The above example has been explained for an animated dragon as the object, with the three object portions body, antennae and shadow. However, the present invention is of course not limited to this example. Moreover, positional information was taken for the object-element-relation information, but the latter can also be size, color or other information and is not limited to positional information.

Fifth Embodiment

The three-dimensional graphics display system with joint use of two-dimensional image representations according to the fifth embodiment, simultaneously represents and displays two-dimensional image representation objects and three-dimensional objects, as in the first embodiment. However, with two-dimensional image processing of the two-dimensional image representation data, such as magnification, rotation, shading, or edge sharpening, two-dimensional images can be flexibly modified. As an example of this fifth embodiment, the dragon 101 is taken as an object to be displayed as a three-dimensional graphics representation, the vase 106 is taken as an object for two-dimensional image representation and several two-dimensional image processing effects affecting the two-dimensional image data of the vase 106 are explained.

The following explanations refer to drawings illustrating an outline of the configuration of the entire three-dimensional graphics display system according to the fifth embodiment and the process-flow on this system.

Figure 17:
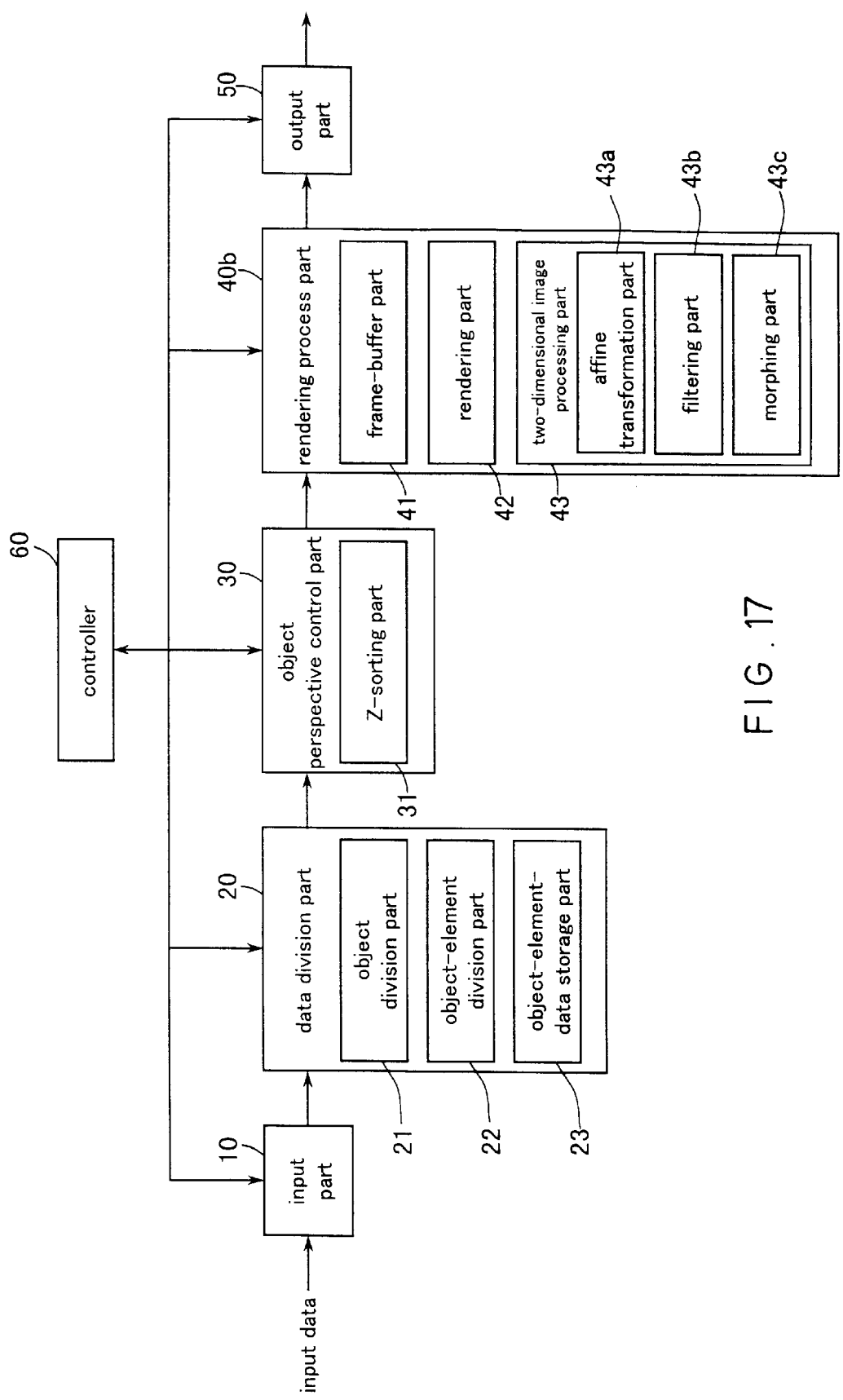
FIG. 17 is a diagram outlining the configuration of a three-dimensional graphics display system according to a fifth embodiment of the present invention.

FIG. 17 is a diagram outlining the configuration of the three-dimensional graphics display system according to the fifth embodiment. As is shown in FIG. 17, instead of the rendering process part 40 of the first embodiment, the fifth embodiment has a rendering process part 40b. Apart from the rendering process part 40b, all elements with the same numbers are substantially the same as explained in the first embodiment, so that their explanation has been omitted. The following explanation concentrates on the rendering process part 40b. As in the first embodiment, the system also comprises the necessary memory, and devices to control the system, although these are not particularly indicated in the drawings.

In addition to the frame-buffer part 41 and the rendering part 42, the rendering process part 40b further comprises a two-dimensional image processing part 43. This two-dimensional image processing part 43 comprises an affine transformation part 43*a*, a filtering part 43*b*, and a morphing part 43*c* for several image processing effects on the two-dimensional images. The two-dimensional image processing part 43 is, however, not limited to this example, and other modules for two-dimensional image processing can be added as necessary.

The affine transformation part 43*a* can alter shapes by magnification, deformation etc. The filtering part 43*b* can attain special effects such as shading, edge sharpening, etc. The morphing part 43*c* can smoothly morph two shapes into each other. The following explanations concentrate on the filtering part 43*b*.

The filtering part 43*b* comprises filter matrices for several image processing operations. The filter matrices that it stores represent, for example, a shading filter, and edge filter, and an embossing filter.

Figure 18:
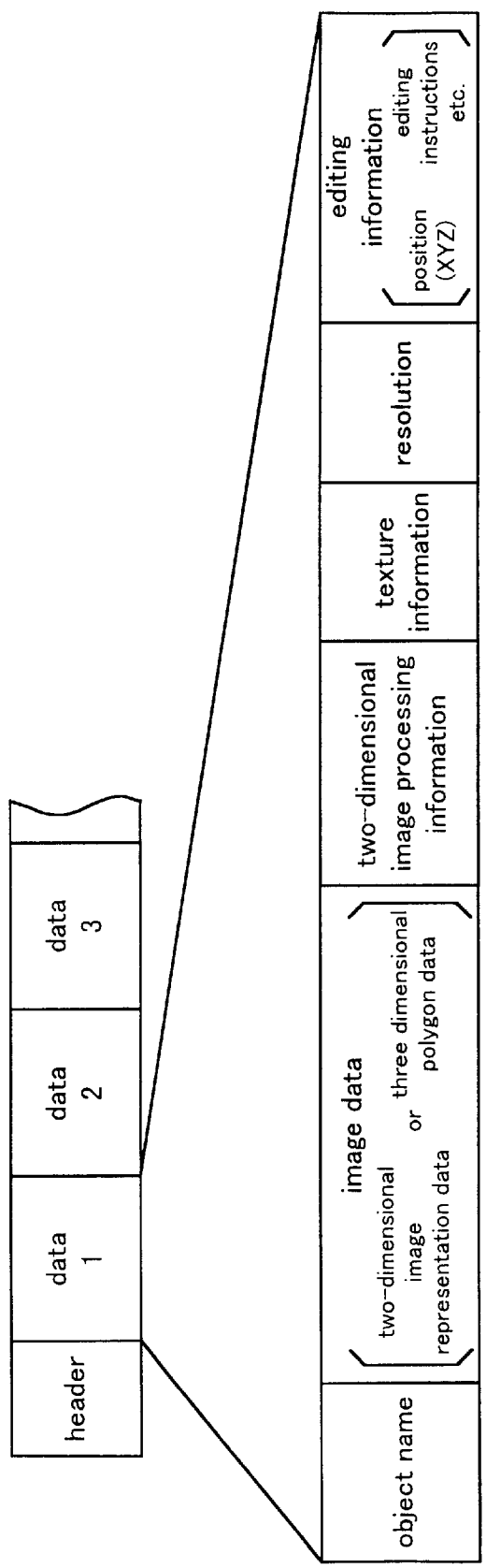
FIG. 18 shows the data structure of the data used in the three-dimensional graphics display system according to the fifth embodiment of the present invention.

FIG. 18 shows the data structure of the data used in the three-dimensional graphics display system according to the fifth embodiment. As is shown in FIG. 18, in addition to the two-dimensional image representation data for two-dimensional image representation objects, two-dimensional image processing information is also given. This two-dimensional image processing information indicates which image processing (for example shading) of which lower module (for example the filtering part 43*b*) of the two-dimensional image processing part 43 is to be performed.

Figure 19:
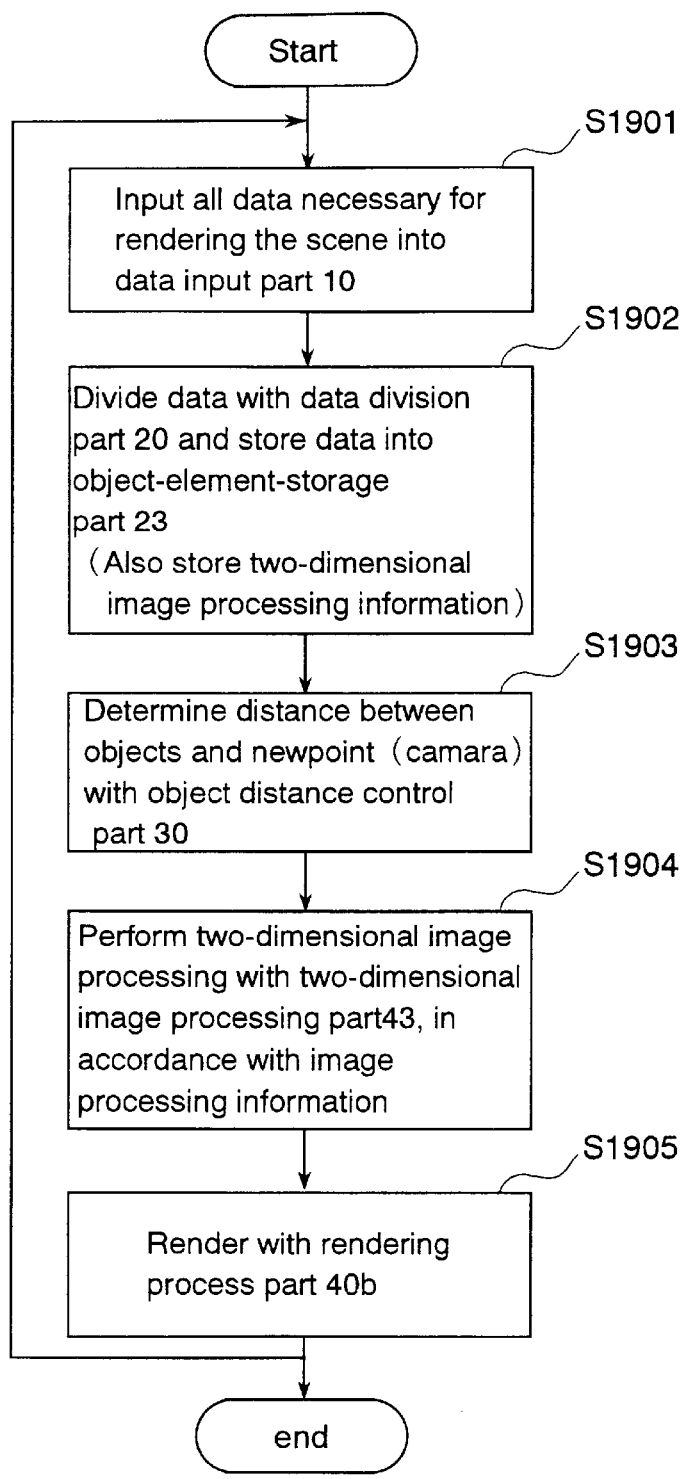
FIG. 19 is a flowchart outlining the entire process-flow of the three-dimensional graphics display system according to the fifth embodiment of the present invention.

FIG. 19 shows the entire process flow of the three-dimensional graphics display system according to the fifth embodiment. The processing steps that are substantially the same as in FIG. 4 of the first embodiment are explained in a simplified manner.

First, the input data for all objects is input into the input part 10 (step S1901 in FIG. 19). The data division part 20 divides and stores the data for each object element (step S1902). In this example, the entered data comprises two-dimensional image representation data for the vase 106 and information concerning an assignment of shading by the filtering part 43*b* as two-dimensional image processing information (for example "43*b*1").

Then, the object perspective control part 30 determines the perspective order (step S1903). According to the result of the Z-sorting, the rendering process part 40*b* renders all object elements into the frame-buffer part 41, while it checks for each rendering process of the two-dimensional image representation object, whether the data is accompanied by two-dimensional image processing information. If there is two-dimensional image processing information, the corresponding two-dimensional image representation data is passed on to the two-dimensional image processing part 43. The two-dimensional image processing part 43 performs two-dimensional image processing in accordance with the two-dimensional image processing information (step S1904). In this example, filtering is performed with the shading filter of the filtering processing part 43*b*.

After this, as in the processing steps shown in FIG. 4 of the first embodiment, the rendering process part 40*b* correctly represents the overlapping of all objects according to their direction and perspective order from the viewpoint (step S1905).

With this system configuration and process flow, a three-dimensional graphics display system joint use of two-dimensional image representations can be provided, that can simultaneously represent and display three-dimensional graphics representations and two-dimensional image representations, and that can realize flexible image representations for two-dimensional image representation data by two-dimensional image processing.

Sixth Embodiment

The three-dimensional graphics display system with joint use of two-dimensional image representations according to the sixth embodiment, simultaneously represents and displays two-dimensional image representation objects and three-dimensional objects, as in the first embodiment. However, two-dimensional objects that are displayed while overlapping in the three-dimensional virtual space are merged and represented as one parent object. When the scene develops such that it becomes necessary to represent a perspective order, the previous two-dimensional image representation objects are rendered separately in the three-dimensional virtual space. In the following example of this fifth embodiment, a table 113 and a background 114 are two-dimensional image representation objects and a dragon 112 is a three-dimensional graphics representation object.

The following explanations refer to drawings illustrating an outline of the configuration of the entire three-dimensional graphics display system according to the sixth embodiment and the process-flow on this system.

Figure 20:
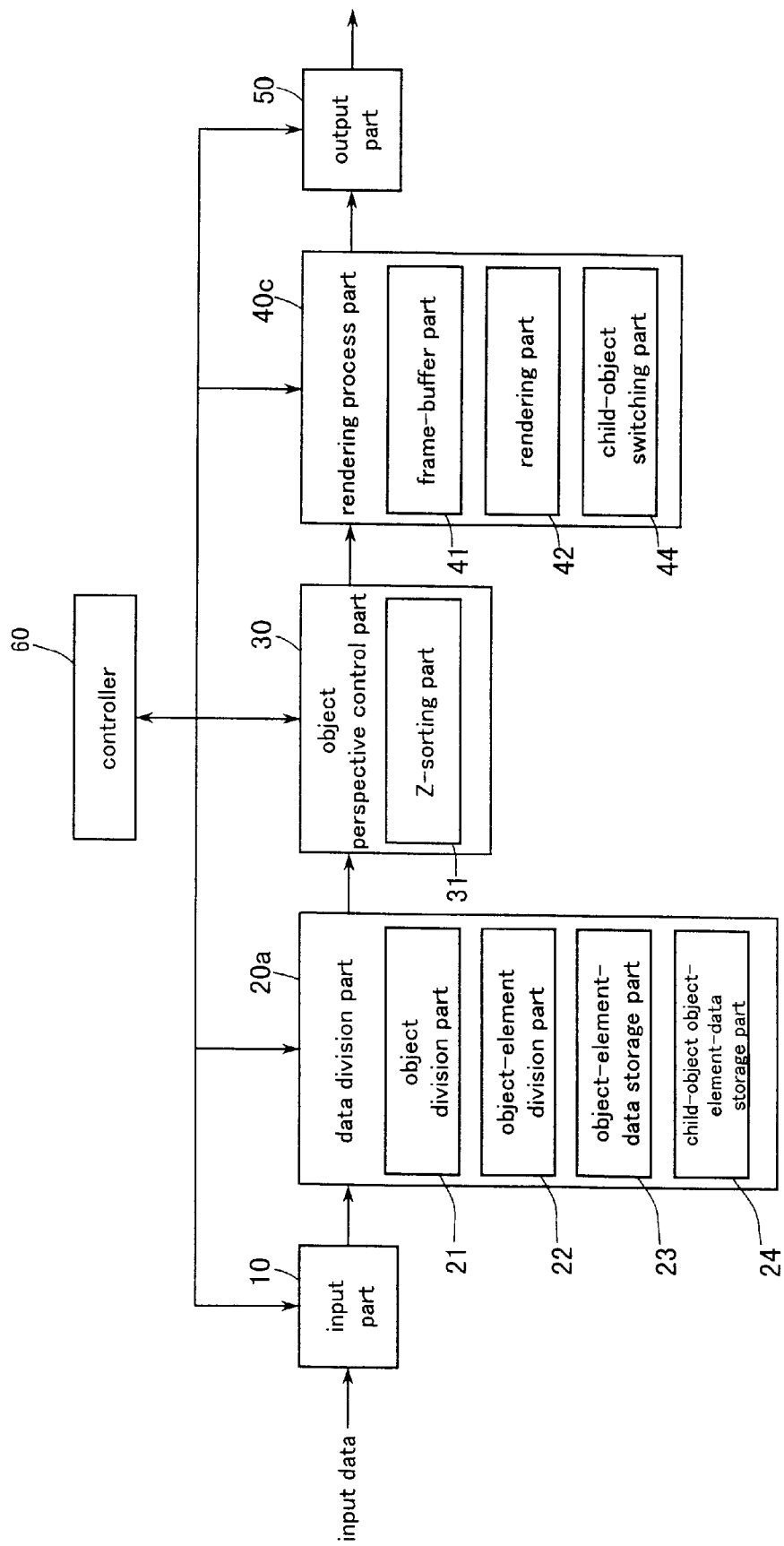
FIG. 20 is a diagram outlining the configuration of a three-dimensional graphics display system according to a sixth embodiment of the present invention.

FIG. 20 is a diagram outlining the configuration of the three-dimensional graphics display system according to the sixth embodiment. As is shown in FIG. 20, instead of the data division part 20 of the first embodiment, the sixth embodiment has a data division part 20*a*, and instead of the rendering process part 40 of the first embodiment, the sixth embodiment has a rendering process part 40*c*. Apart from the data division part 20*a* and the rendering process part 40*c*, all elements with the same numbers are substantially the same as explained in the first embodiment, so that their explanation has been omitted. The following explanation concentrates on the data division part 20*a* and the rendering process part 40*c*. As in the first embodiment, the system also comprises the necessary memory, and devices to control the system, although these are not particularly indicated in the drawings.

In addition to the object division part 21, the object-element division part 22, and the object-element-data storage part 23, the data division part 20*a* comprises a child-object object-element-data storage part 24.

The rendering process part 40*c* comprises a frame-buffer part 41, a rendering part 42, and a child-object switching part 44.

Figure 21:
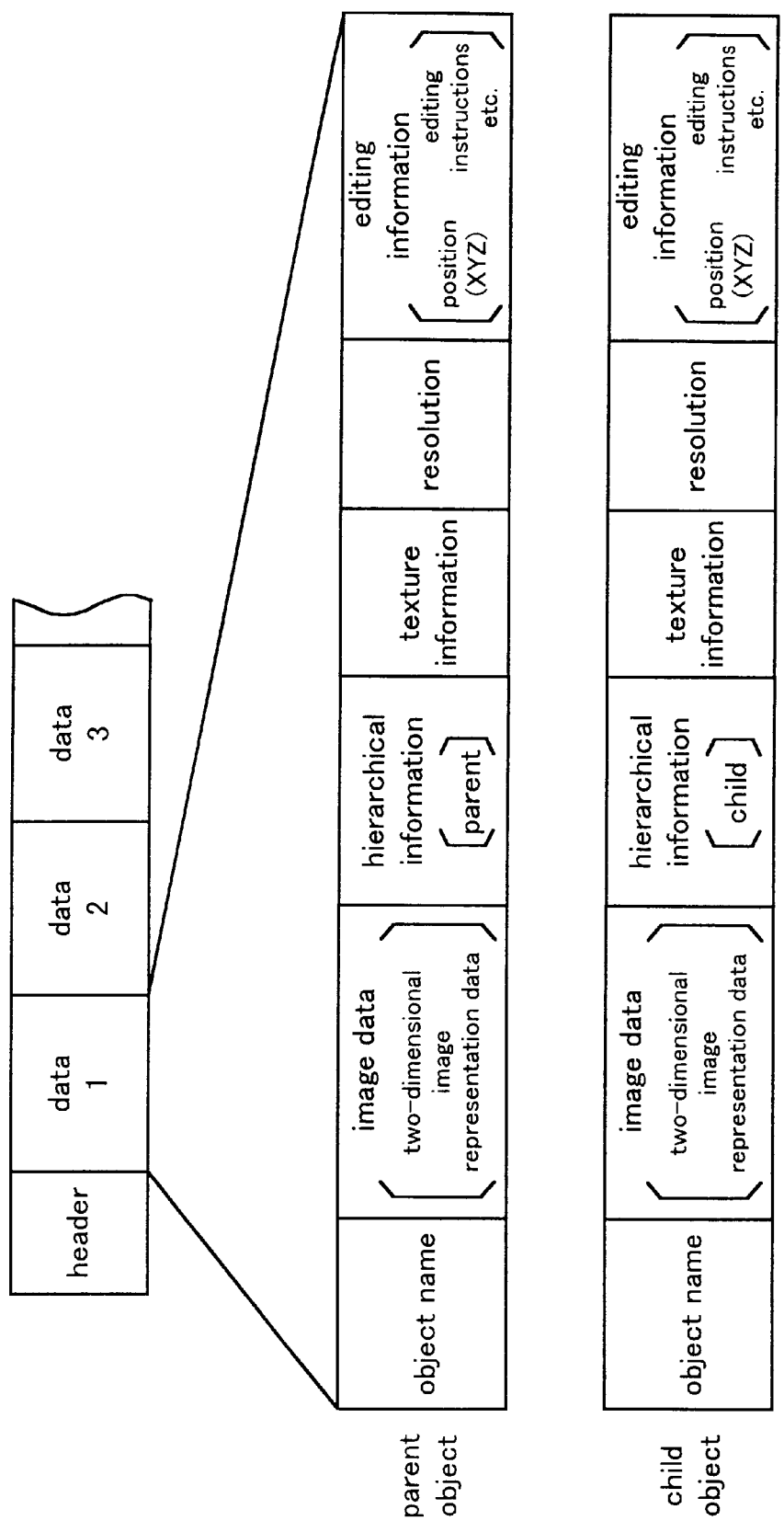
FIG. 21 shows the data structure of the data used in the three-dimensional graphics display system according to the sixth embodiment of the present invention.
Figure 22:
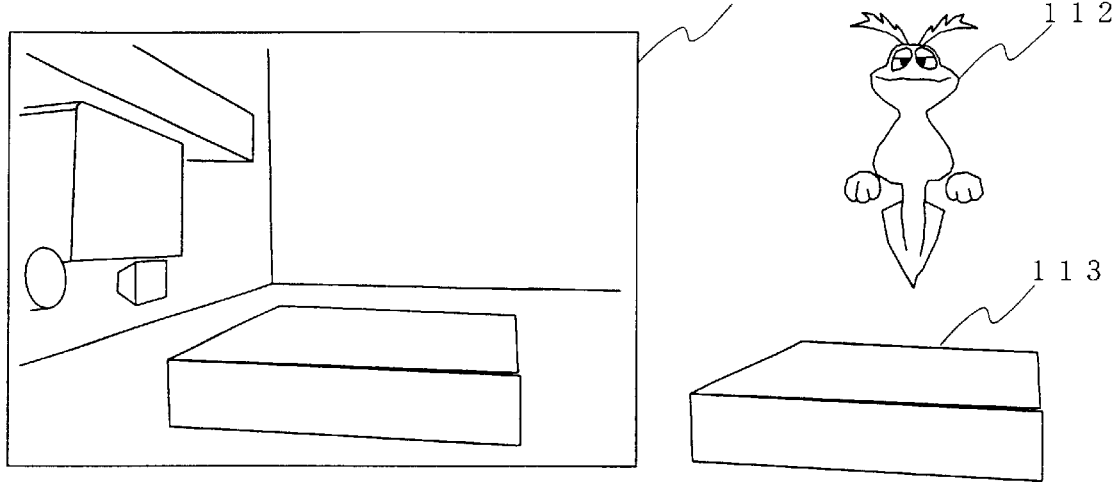
FIGS. 22(a)–(c) illustrate an example for a parent object and a child object and examples of the result of rendering the objects.
Figure 22:
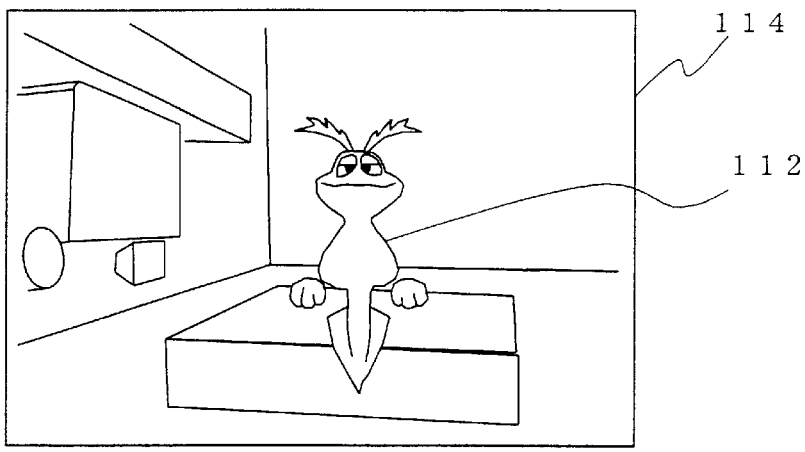
Figure 22:
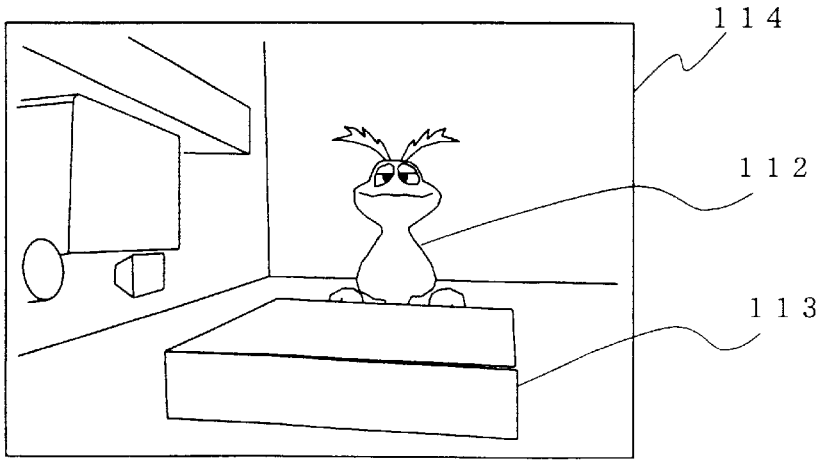

FIG. 21 illustrates the data structure for input data in the sixth embodiment. As is shown in FIG. 21, the data for one two-dimensional image representation object is given by data for the parent object and data for the child object, which are in a hierarchical relation to each other (that is, a parent-child relation). In the example of FIG. 21, the data structure comprises hierarchical attribute information indicating the hierarchical relation. In this example, the parent object consists of two-dimensional image data comprising the child objects in one piece, such as the background 114 into which the table 113 has been drawn. Normally, both are two-dimensional image representations, which do not move, so that it is possible to represent them as one two-dimensional image. On the other hand, a child object means an individual object, such as the table, which is drawn as one into the parent object background. FIG. 22*a* shows an example of all objects.

The data division part 20*a* divides the input data and stores three-dimensional object elements and two-dimensional object elements attributed as parent objects into the object-element-data storage part 23, and two-dimensional object elements attributed as child objects into the child-object object-element-data storage part 24.

The child-object switching part 44 of the rendering process part 40c judges whether a perspective order in the three-dimensional space between the parent object and the child object is necessary. If such a perspective order is necessary, the child-object object-element-data storage part 24 switches to the two-dimensional image representation data of the child object.

Figure 23:
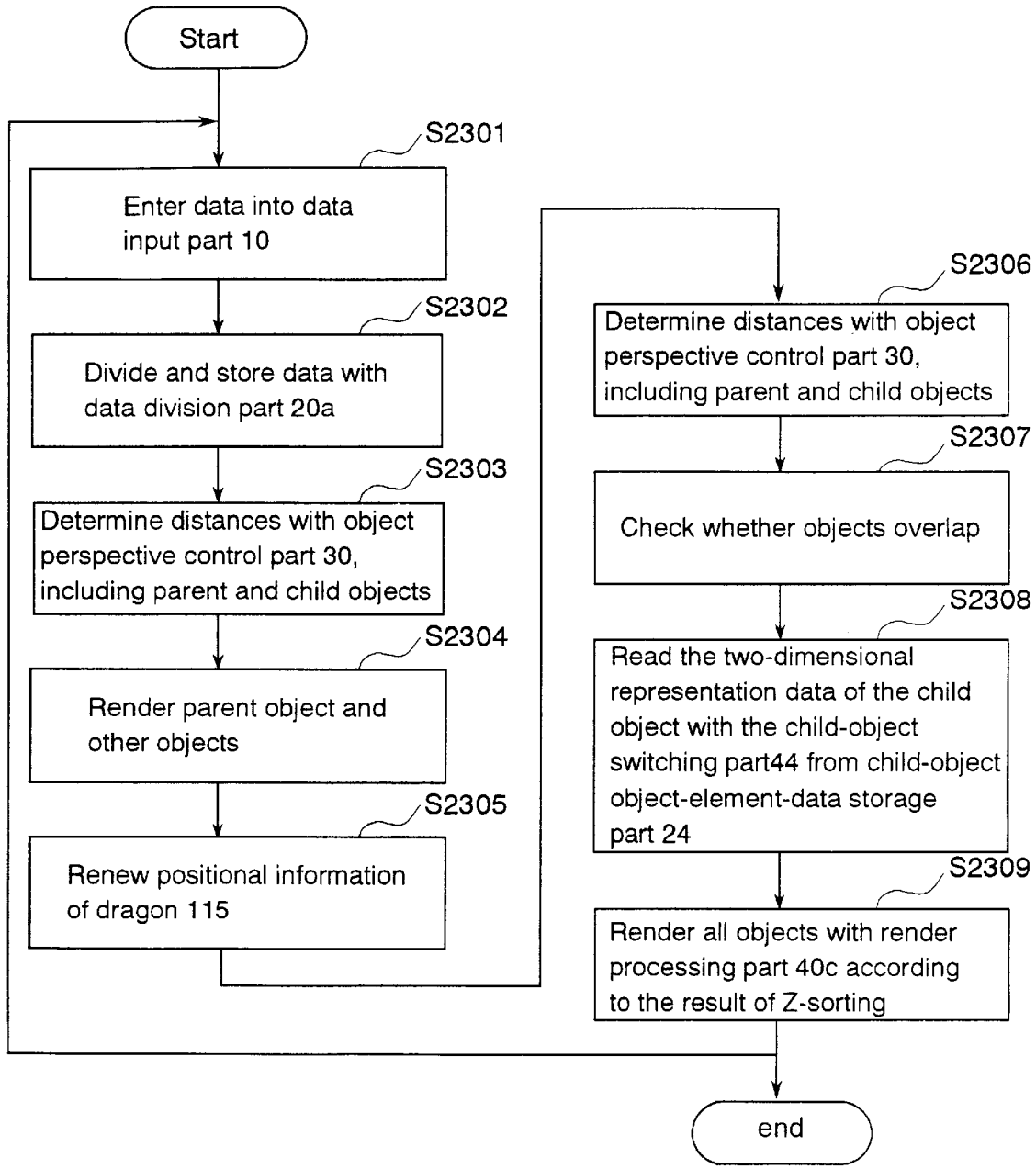
FIG. 23 is a flowchart outlining the entire process-flow of the three-dimensional graphics display system according to the sixth embodiment of the present invention.

FIG. 23 shows the entire process flow of the three-dimensional graphics display system according to the sixth embodiment. The processing steps that are substantially the same as in FIG. 4 of the first embodiment are explained in a simplified manner.

First, the input data for all objects is input into the input part 10 (step S2301 in FIG. 23).

Then, the data division part 20a divides and stores the data for each object element (step S2302). In this example, the entered data is divided into object elements for the dragon 112 and object elements of two-dimensional images for the background 114 (into which a table has been drawn), which is the parent object, and this object-element data is stored in the object-element-data storage part 23. The object element of the two-dimensional image of the table 113, which is a child object, is stored in the child-object object-element-data storage part 24.

Then, the object perspective control part 30 determines the perspective order (step S2303). In this example, the Z-sorting is performed not only on the Z-values of objects stored in the object-element-data storage part 23 but also on the Z-value of child objects stored in the child-object object-element-data storage part 24. In this example, it yields the order: background 114, table 113, and dragon 112.

Since as a result of the Z-sorting there are no objects intruding between the background 114, which is the parent object, and the table 113, which is the child object, the rendering process part 40c excludes the rendering process of the child object, and renders the three-dimensional objects in the object-element-data storage part 23 and the data of the parent object into the frame-buffer part 41 (step S2304). The result is illustrated in FIG. 22(b).

Assuming that the positional information of the dragon 112 is renewed such that it moves to a position between the table 113 and the background 114, the data for the dragon 112 in the object-element-data storage part 23 is then renewed (step S2305).

Then, the object perspective control part 30 determines the perspective order (step S2306). In this example, the order is: background 114, dragon 112, and table 113.

Since as a result of the Z-sorting the object of the dragon 112 intrudes between the background 114, which is the parent object, and the table 113, which is the child object, the rendering process part 40c checks whether the objects overlap (step S2307). Since the objects overlap, the child-object switching part 44 reads the two-dimensional image representation data of the table 113, which is the child object, from the child-object object-element-data storage part 24 (step S2308). In accordance with the result of the Z-sorting, the rendering process part 40c renders the background 114, which is the parent object, the dragon 112, which is a three-dimensional object, and the table 113, which is the child object, in this order into the frame-buffer part 41 (step S2309). The result is illustrated in FIG. 22(c).

In accordance with the process flow in this system, a three-dimensional graphics display system can be provided, wherein three-dimensional objects and two-dimensional image representation objects are simultaneously represented and displayed, if possible, two-dimensional image representation objects are rendered as one two-dimensional image representation object, and if necessary, two-dimensional image representation objects are rendered as individual child objects in the three-dimensional virtual space, whereby the amount of data processing is reduced.

Seventh Embodiment

Figure 24:
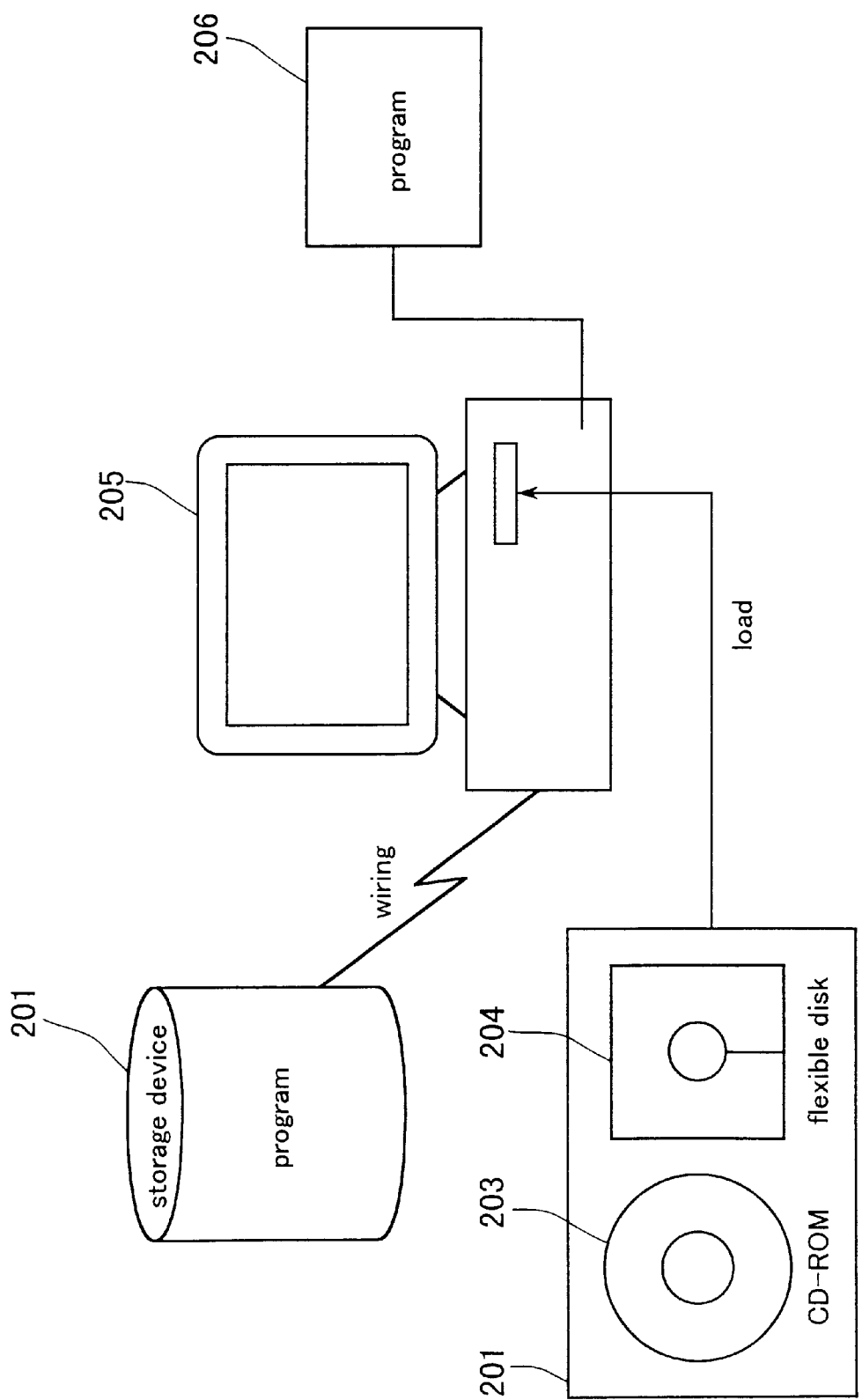
FIG. 24 is an example of a recording medium according to the present invention.

The image data used for the three-dimensional graphics display system according to the present invention, can be used in a three-dimensional graphics display system if it is stored on a system-readable recording medium. Moreover, a three-dimensional graphics display system according to the present invention can be installed on all kinds of computers if it is expressed as a program performing the process steps to realize the three-dimensional graphics display system, and stored on a computer-readable recording medium. A recording medium recording data used for a three-dimensional graphics display system according to the present invention or a recording medium storing a program performing process steps the process steps to realize a three-dimensional graphics display system according to the present invention cannot only be stored on a removable storage medium 202, such as a CD-ROM 203 or a flexible disk 204, but also on a recording medium 201 in a storage device on a network, or in the RAM of a computer or a hard-disk, as shown in FIG. 24. When the program is executed, it is loaded onto a computer 205, and executed in the main memory of the computer.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A three-dimensional graphics display system comprising:
   a data input part receiving input data comprising:
   (a) three-dimensional polygon data for a three-dimensional object representing a three dimensional image; and
   (b) two-dimensional image representation data provided for a two-dimensional image representation object, wherein the two-dimensional image representation object represents a corresponding three-dimensional object as a two-dimensional image arranged in a three-dimensional virtual space, wherein the two-dimensional image representation data comprising (i) two-dimensional image data is defined on an x-y coordinate system and (ii) a Z-value representing a depth within the virtual space;
   an object perspective control part for determining a perspective order of objects based on the input data;
   a rendering process part for overlappingly rendering objects, including the tree-dimensional object and the two-dimensional image representation object, in order from a rest object to a nearest object, based on the determined perspective order, to correctly represent overlap due to perspective representation; and
   an output part for displaying a rendering result; wherein three-dimensional objects and two-dimensional image representation objects are rendered simultaneously in the three-dimensional virtual space.

2. The three-dimensional graphics display system of claim 1, further comprising:

an object exclusion control part for exclusion-controlling an area occupied by the three-dimensional object and an area occupied by the two-dimensional image representation object in the three-dimensional virtual space; wherein the system can represent a virtual collision in the three-dimensional virtual space between the three-dimensional object and the two-dimensional image representation object, the virtual collision being caused by a movement of the three-dimensional object.

3. The three-dimensional graphics display system of claim 1, wherein the input data further comprises supplementary three-dimensional polygon data that is associated with the two-dimensional image representation data for the two-dimensional image representation object, the supplementary three-dimensional polygon data representing a three-dimensional object that is the basis of the two-dimensional image representation object as a three-dimensional image;

the system further comprises a data switching part for switching from the two-dimensional image representation data to the supplementary three-dimensional polygon data; and said data switching part selectively switches from the two-dimensional image representation data to the supplementary three-dimensional polygon data to represent a two-dimensional image representation object as a three-dimensional object.

4. The three-dimensional graphics display system of claim 2, wherein the input data further comprises supplementary three-dimensional polygon data that is associated with the two-dimensional image representation data for the two-dimensional image representation object, the supplementary three-dimensional polygon data representing a three-dimensional object that is the basis of the two-dimensional image representation object as a three-dimensional image;

the system further comprises a data switching part for switching from the two-dimensional image representation data to the supplementary three-dimensional polygon data; and said data switching part selectively switches from the two-dimensional image representation data to the supplementary three-dimensional polygon data to represent a two-dimensional image representation object as a three-dimensional object.

5. The three-dimensional graphics display system of claim 1, wherein the input data further comprises object-relation information that is associated with a relation between image data of object portions and other object portions as data for object portions forming a character in the three-dimensional virtual space;

for each object portion, the rendering process part performs a rendering process based on the three-dimensional polygon data or the two-dimensional image representation data for the object portion and the object-relation information;

a movement of the character is represented by renewing the object-relation information.

6. The three-dimensional graphics display system of claim 1, further comprising a two-dimensional image processing part for image processing two-dimensional images; wherein the input data further comprises two-dimensional image processing instruction data for instructing two-dimensional image processing of the two-dimensional image representation object;

based on the two-dimensional image processing instruction data, the two-dimensional image processing part performs two-dimensional image processing of the two-dimensional image representation data for the two-dimensional image representation object.

7. The three-dimensional graphics display system of claim 1, wherein a child object and a parent object are in a perspective order to each other in the three-dimensional virtual space, the child object is a two-dimensional image representation object displayed by overlapping, and the child object is drawn into the parent object;

the input data further comprises (a) two-dimensional image representation data for the parent object, and (b) hierarchical information expressing the hierarchical relationship between the parent object and the child object;

the rendering process part performs a rendering process based on image data of the parent object, an object that is not in a hierarchical relationship with the parent object, and the child object, wherein the other object is between the parent object and the child object in the perspective order determined by said object perspective control part.

8. A computer-readable recording medium storing a program for displaying an image of a three-dimensional object on an output device based on three dimensional polygon data, the program performing an input operation of inputting:

(a) three-dimensional polygon data for a three-dimensional object representing a three dimensional image; and (b) two-dimensional image representation data provided for a two-dimensional image representation object, wherein the two-dimensional image representation object represents a corresponding three-dimensional object as a two-dimensional image arranged in a three-dimensional virtual space, wherein the two-dimensional image representation data comprising (i) two-dimensional image data is defined on an x-y coordinate system and (ii) a Z-value representing a depth within the virtual space;

a determination operation of determining a perspective order of objects based on the input data;

a rendering operation of overlappingly rendering objects, including the three-dimensional object and the two-dimensional image representation object, in order from a furthest object to a nearest object, based on the determined perspective order, to correctly represent overlap due to perspective representation; and an output operation displaying a rendering result; wherein three-dimensional objects and two-dimensional image representation objects are rendered simultaneously in the three-dimensional virtual space.

* * * * *

UNITED STATES PATENT AND TRADEMARK OFFICE
CERTIFICATE OF CORRECTION

PATENT NO. : 6,392,644 B1
DATED : May 21, 2002
INVENTOR(S) : Ryosuke Miyata et al.

It is certified that error appears in the above-identified patent and that said Letters Patent is hereby corrected as shown below:

<u>Column 20,</u>
Line 57, change "tree" to -- three --.
Line 59, change "rest" to -- furthest --.

Signed and Sealed this

Twenty-fourth Day of September, 2002

Attest:

JAMES E. ROGAN
Attesting Officer    Director of the United States Patent and Trademark Office